US010365803B2

(12) United States Patent
Yao

(10) Patent No.: US 10,365,803 B2
(45) Date of Patent: *Jul. 30, 2019

(54) METHOD FOR GENERATING TOUCH CONTROL INSTRUCTION OF KEYBOARD, AND COMPUTER PROGRAM PRODUCT AND NON-TRANSITORY COMPUTER READABLE MEDIUM OF TOUCH CONTROL INSTRUCTION

(71) Applicant: Bing-Yang Yao, Taipei (TW)

(72) Inventor: Bing-Yang Yao, Taipei (TW)

( * ) Notice: Subject to any disclaimer, the term of this patent is extended or adjusted under 35 U.S.C. 154(b) by 151 days.

This patent is subject to a terminal disclaimer.

(21) Appl. No.: 15/581,712

(22) Filed: Apr. 28, 2017

(65) Prior Publication Data
US 2017/0315628 A1 Nov. 2, 2017

(30) Foreign Application Priority Data
Apr. 29, 2016 (TW) .............................. 105113619 A

(51) Int. Cl.
| G06F 3/041 | (2006.01) |
| G09G 3/36 | (2006.01) |
| G06F 3/0484 | (2013.01) |
| G06F 3/0488 | (2013.01) |
| G06F 3/02 | (2006.01) |
| G06F 3/023 | (2006.01) |
| H01H 13/70 | (2006.01) |

(52) U.S. Cl.
CPC .......... *G06F 3/0484* (2013.01); *G06F 3/0202* (2013.01); *G06F 3/023* (2013.01); *G06F 3/0416* (2013.01); *G06F 3/04886* (2013.01); *H01H 13/70* (2013.01)

(58) Field of Classification Search
CPC ............... G06F 3/0213; G06F 3/03547; G06F 3/04883; G06F 2203/04808; G06F 3/0202; G06F 3/023; G06F 3/0416; G06F 3/0484; G06F 3/04886; H01H 13/70
See application file for complete search history.

(56) References Cited

U.S. PATENT DOCUMENTS

| 8,928,590 B1 | 1/2015 | El Dokor | |
| 8,976,117 B2* | 3/2015 | Krahenbuhl | ............ G06F 1/169 |
| | | | 345/169 |
| 8,982,069 B2* | 3/2015 | Laubach | ............... G06F 3/0213 |
| | | | 345/173 |
| 2015/0067513 A1* | 3/2015 | Zambetti | ............... G06F 3/0482 |
| | | | 715/716 |

* cited by examiner

*Primary Examiner* — Nelson M Rosario

(57) ABSTRACT

A method for generating a touch control instruction, includes: loading an instruction condition definition table, where the instruction condition definition table includes a plurality of touch control instructions, and each touch control instruction includes a plurality of instruction conditions and definition values corresponding to the instruction conditions; reading a first key signal output by a physical keyboard corresponding to a touch on a keycap; recognizing a touch control event according to multiple consecutive first key signals; obtaining a plurality of detection values of the touch control event and comparing the detection values with the definition values; if the detection values match definition values of all instruction conditions of a touch control instruction, stopping tracing of the touch control event; and executing the matched touch control instruction.

17 Claims, 30 Drawing Sheets

METHOD FOR GENERATING TOUCH CONTROL INSTRUCTION OF KEYBOARD, AND COMPUTER PROGRAM PRODUCT AND NON-TRANSITORY COMPUTER READABLE MEDIUM OF TOUCH CONTROL INSTRUCTION

CROSS-REFERENCE TO RELATED APPLICATION

This non-provisional application claims priority under 35 U.S.C. § 119(a) to Patent Application No. 105113619 filed in Taiwan, R.O.C. on Apr. 29, 2016, the entire contents of which are hereby incorporated by reference.

BACKGROUND

Technical Field

The present invention relates to a touch control operation method of computing devices such as a computer, a mobile device, or a head-up display/head-mounted display/virtual reality display device, and in particular, to a method for generating a touch control operation by using a touch control keyboard, and a computer program product and a non-transitory computer readable medium of the touch control operation.

Related Art

An U.S. Pat. No. 8,928,590 B1 (inventor: Tarek) entitled "GESTURE KEYBOARD METHOD AND APPARATUS" discloses a keyboard capable of capturing an operation gesture. The keyboard captures operation gestures of a user within a gesture operation range (that is, a visible range of camera lenses) by using a pair of camera lenses disposed on the keyboard, and is capable of interacting with a system after the gestures are recognized.

The gesture operation range in the prior art is approximately 4 inches above the keyboard, and operation gestures in the gesture operation range have no connection with keys on a physical keyboard. In the prior art, the keyboard recognizes gestures by using a camera and the image recognition technology and converts the gestures into operation instructions. This also has no connection with the touch control technology. In addition, the image recognition technology may result in problems of misjudgments because images captured by a camera are not clear, or a problem that when ambient light sources are insufficient, a camera cannot capture images. Therefore, it is necessary to improve the prior art to provide a touch control keyboard to generate a touch control instruction to operate applications on a computing device by replacing the image recognition technology with the touch sensing technology, avoid the problems of misjudgments in image recognition, and resolve the problem that when ambient light sources are insufficient, a camera cannot capture images.

SUMMARY

In view of this, the present invention provides a method for generating a touch control instruction of a keyboard, and a computer program product and a non-transitory computer readable medium of the touch control instruction, to generate a touch control instruction by using a touch control keyboard, so as to manipulate an application executed on a computing device.

An embodiment of the present invention provides a method for generating a touch control instruction, applied to connecting to a computing device of a physical keyboard, wherein the physical keyboard comprises a plurality of keycaps capable of responding to a touch on a keycap to output a first key signal to the computing device, and the method for generating a touch control instruction comprises: loading an instruction condition definition table, wherein the instruction condition definition table comprises a plurality of touch control instructions, and each touch control instruction comprises a plurality of instruction conditions and definition values corresponding to the instruction conditions; reading the first key signal output by the physical keyboard corresponding to the touch on the keycap; recognizing a touch control event according to multiple consecutive first key signals; obtaining a plurality of detection values of the touch control event and comparing the detection values with the definition values; if the detection values match definition values of all instruction conditions of a touch control instruction, stopping tracing of the touch control event; and executing the matched touch control instruction.

The present invention also provides a computer program product comprising a plurality of computer executable instructions stored in a non-transitory computer readable medium. The computer executable instructions are loaded and executed by the computing device to cause the computing device to complete the above-described method of generating a touch control instruction from fingers activities on a touch control keyboard.

The present invention further provides a non-transitory computer readable medium storing a computer program, where the computer program comprises a plurality of computer executable instructions for executing the above-described method for generating a touch control instruction from fingers activities on a touch control keyboard.

The following implementation manners describe in detail features and advantages of the present invention. The content enables any person skilled in the art to know technical content of the present invention and implement the technical content. A person skilled the art can easily understand the objectives and advantages of the present invention according to the content, the application scope, and drawings disclosed in this specification.

DETAILED DESCRIPTION

The present invention is applied to, but is not limited to, computing devices such as a personal computer (PC/Mac), a notebook computer (Laptop/Portable Computer), a smartphone, a tablet computer, a smart television, a head-up display device, a head-mounted display device, a virtual reality display device, and a video game console (or TV Game Console), which are in communication connection with a physical keyboard 18 and screens 76a, 76b, and 76c. A manner for the communication connection may be a wireless communication manner or a wired communication manner. The physical keyboard 18 and the screens 76a, 76b, and 76c may be disposed outside the computing device and connected to the computing device, or may be disposed as a part of the computing device.

Accompanying drawings of this specification are used to describe functions and technical features of the present invention, but are not intended to limit appearance of the present invention. Multiple embodiments of the physical keyboard 18 and multiple embodiments of the on-screen keyboards 68a, 68b, 68c, and 68d are separately described below. The physical keyboard 18 in the different embodiments may be arbitrarily cooperated with the on-screen keyboards 68a, 68b, 68c, and 68d in the different embodiments.

Figure 1:
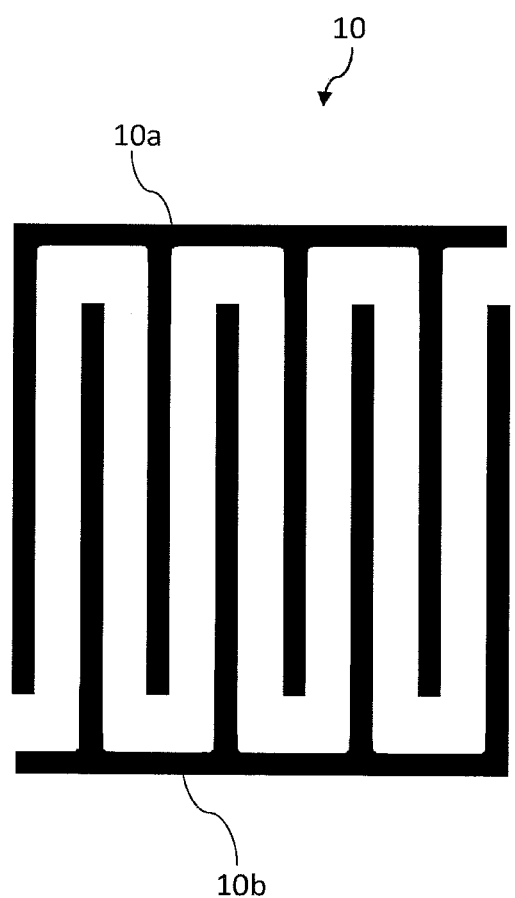
FIG. 1 is a schematic diagram of distribution of a touch key part of a physical keyboard according to an embodiment of the present invention.

Referring to FIG. 1, FIG. 1 is a schematic diagram of distribution of a touch key part 10 of a physical keyboard 18 according to an embodiment of the present invention. A touch key part 10 is combined by a first detection electrode 10a and a second detection electrode 10b. The first detection electrode 10a and the second detection electrode 10b which are neighboring and non-conductive to each other to form a coupling capacitor. In an embodiment, the first detection electrode 10a and the second detection electrode 10b are fork-shaped and interlaced with each other. The touch key part 10 is made from a highly conductive material. The touch key part 10 is located at an upper outer surface (that is, a contact surface capable of being touched by fingers) of a keycap 12a. For convenience of description and identification, the first detection electrode 10a and the second detection electrode 10b are presented in black bold lines herein, but a color of the touch key part 10 is not limited in the present invention. In some embodiments, the touch key part 10 is made from a material of a highly conductive polymer. A dye of any color may be added in a manufacturing process, so that the manufactured touch key part 10 and the keycaps 12a are of the same color and look like a one-piece component in appearance and are relatively artistic. Alternatively, colors of a high contrast ratio may be selected to respectively manufacture the touch key part 10 and the keycap 12a, so that the touch key part 10 has an eye-attracting visual effect. In addition, appearance of the touch key part 10 is not limited in the present invention to being square as the figure shows. In some embodiments, appearance of the touch key part 10 may also be ring-shaped (which is commonly seen in keys of a conventional touch control electronic apparatus and is not shown in the figure).

Figure 2:
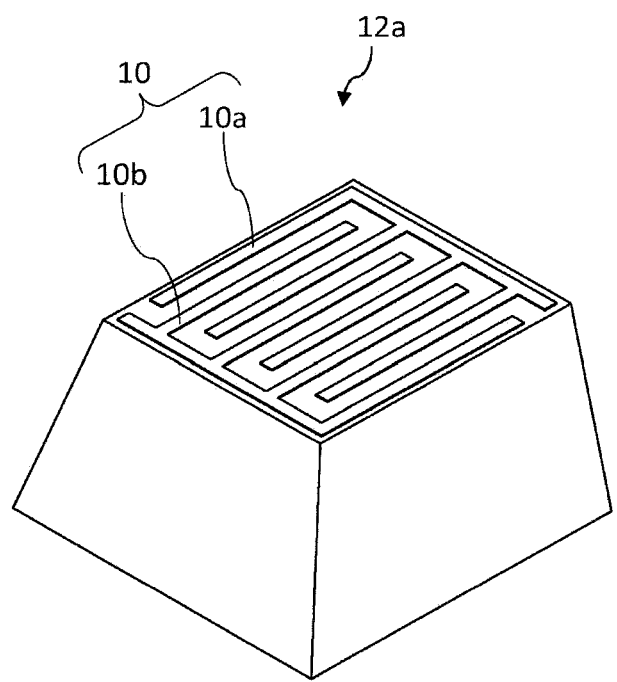
FIG. 2 is an axonometric view of a keycap of a physical keyboard according to a first embodiment of the present invention.

Referring to FIG. 2, FIG. 2 is an axonometric view of a keycap 12*a* of a physical keyboard 18 according to a first embodiment of the present invention. The touch key part 10 on the keycap 12*a* of the first embodiment is presented in an embossed manner, but it is not limited that the touch key part 10 should be higher than the surface of the keycap 12*a*. In some embodiments, the upper outer surface of the keycap 12*a* is a flat surface (that is, the touch key part 10 is internally embedded into the keycap 12*a*, so that the touch key part 10 and plastic of the keycap 12*a* in a gap is of the same height), so that a user cannot feel a difference in a sense of finger touch. For convenience of description, a mark representing each of the keycaps 12*a* is omitted in the figure, but this is not intended to limit a printed mark of the keycap 12*a* of the present invention. Actually, the printed mark on the keycap 12*a*, unless the keycap 12*a* uses any ablation and etching method, does not affect normal operations of the touch key part 10.

Figure 3:
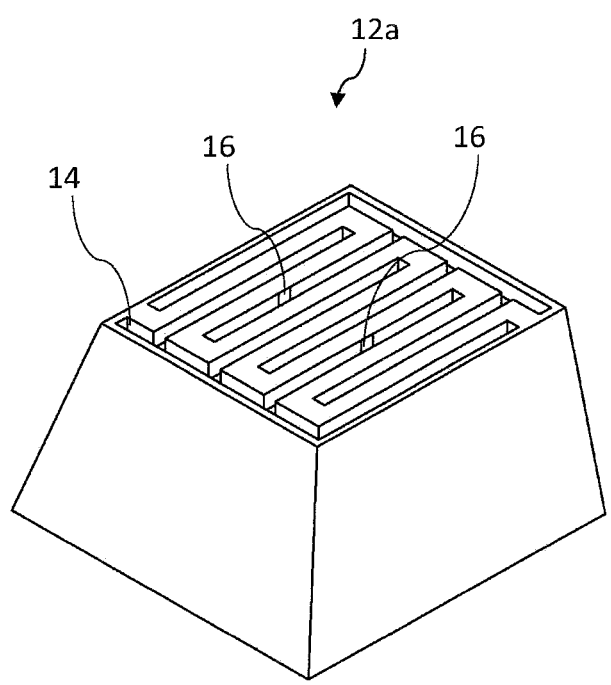
FIG. 3 is an axonometric view of a preserved groove of the keycap of the physical keyboard according to the first embodiment of the present invention.
Figure 4:
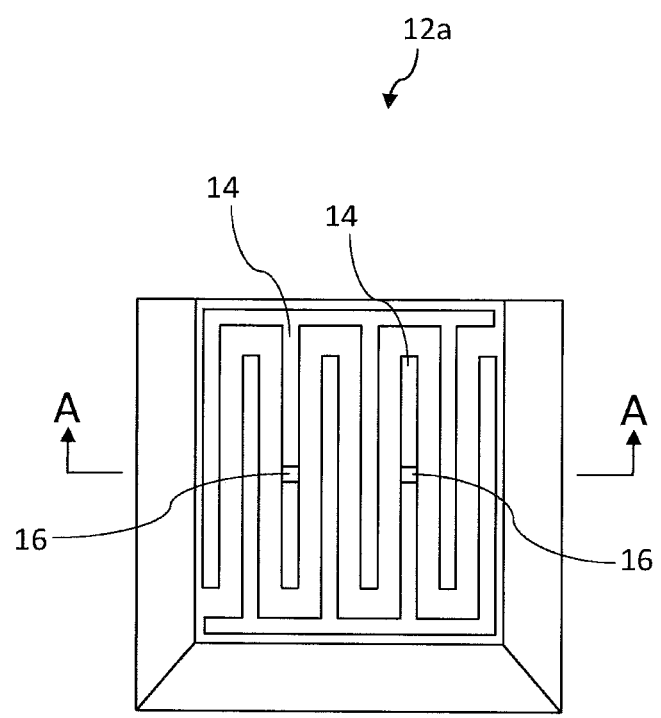
FIG. 4 is a top view of the preserved groove of the keycap of the physical keyboard according to the first embodiment of the present invention.

Subsequently, refer to FIG. 3 and FIG. 4 together. FIG. 3 is an axonometric view of a preserved groove of the keycap 12*a* of the physical keyboard 18 according to the first embodiment of the present invention. FIG. 4 is a top view of the preserved groove of the keycap 12*a* of the physical keyboard 18 according to the first embodiment of the present invention. Manufacturing methods of the keycap 12*a* and the touch key part 10 are described below. In some embodiments, after plastic injection molding is performed on the keycap 12*a* by means of a keycap mould, a touch key part groove 14 fitting distribution shapes of the first detection electrode 10*a* and the second detection electrode 10*b*, and a through hole 16 located below the first detection electrode 10*a* and the second detection electrode 10*b* are manufactured by means of a chemical etching or laser etching process. Subsequently, a highly conductive material in liquid is injected into the touch key part groove 14 and the through hole 16 by using a filling, coating, or printing technique and is waited to be consolidated. Alternatively, the molded touch key part 10 in solid state (such as a highly conductive polymer, or a copper foil) may be assembled in the touch key part groove 14 and the through hole 16 of the keycap 12*a*. In some embodiments, a double shot mould injection (that is, Double Shot Injection Molding, also referred to as overmolding) manufacturing process may also be used, and the keycap 12*a* and the touch key part 10 are manufactured by double shot plastic injection molding. For example, first-shot injection is performed on the highly conductive material by using a mould of the touch key part 10 including a pair of conductive bars, and after the highly conductive material is molded, a keycap mould is additionally assembled and second-shot injection is performed on an ABS (Acrylonitrile Butadiene Styrene Copolymers), PBT (Polybutylene Terephthalate), or POM (Polyformaldehyde) material. It is suitable contrariwise. First-shot injection is performed on ABS, PBT, or POM by using a keycap mould preserving the touch key part groove 14 and the through hole 16, and after ABS, PBT, or POM is molded, second-shot injection is performed on the highly conductive material. By means of the foregoing manufacturing methods, the highly conductive material may be disposed in the touch key part groove 14 and the through hole 16, so that the upper outer surface of the keycap 12*a* is flat. In this case, a position and a section of the foregoing through hole 16 depend on distribution and an interval between the first detection electrode 10*a* and the second detection electrode 10*b*. In addition, positions of a first conductive bar 24*a* and a second conductive bar 24*b* that are mentioned below should also be considered.

Figure 5:
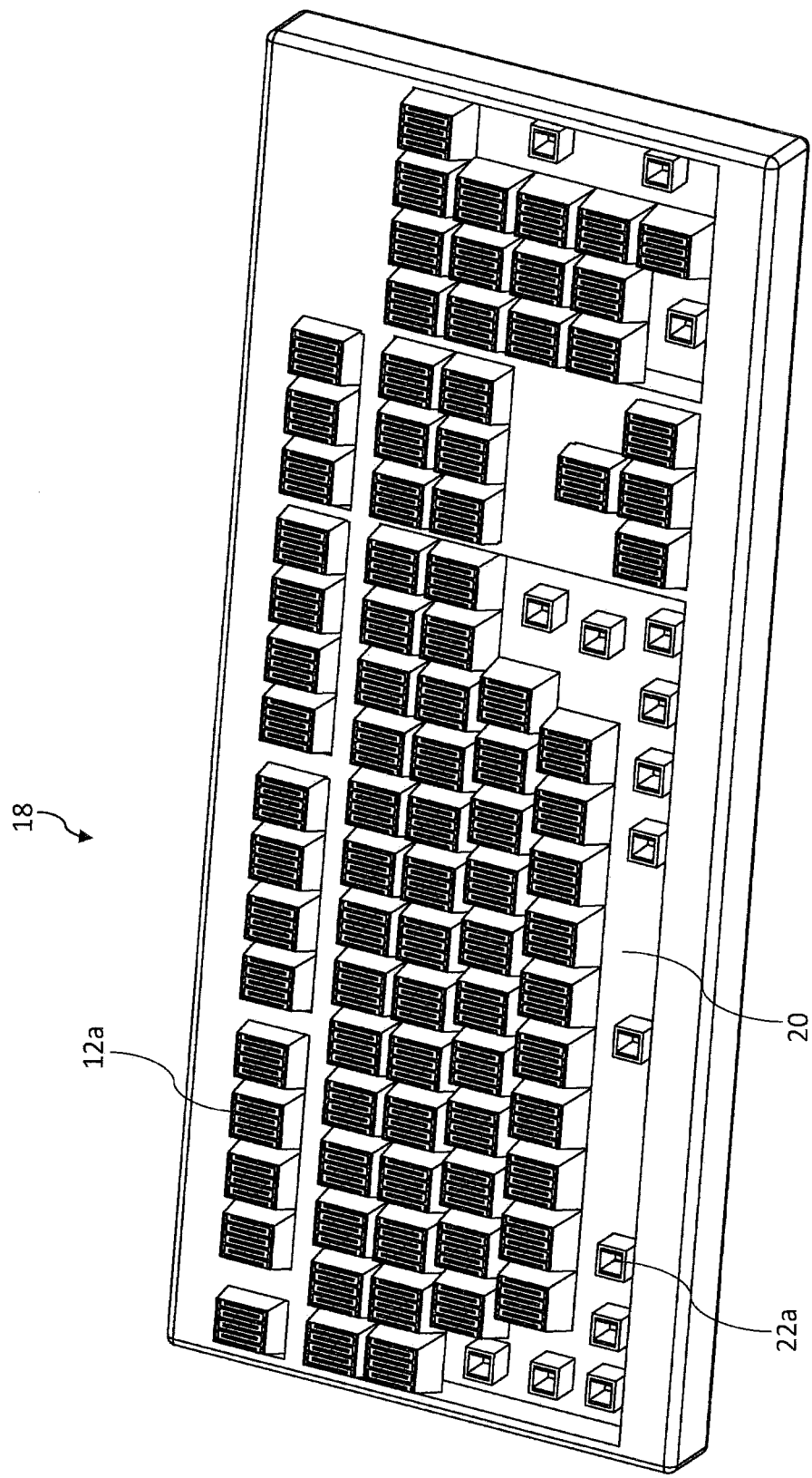
FIG. 5 is an axonometric view of the physical keyboard according to the first embodiment of the present invention.

Referring to FIG. 5, FIG. 5 is an axonometric view of a physical keyboard 18 according to the first embodiment of the present invention. For convenience of description below, the physical keyboard 18 in the figure is obtained after some keycaps 12*a* are removed to display structures of a supporting plate 20 and supporting housings 22*a* below the keycap 12*a*. In some embodiments, the supporting plate 20 is a part of an upper case (also referred to as a top-cover) of the physical keyboard 18, that is, the supporting plate 20 and the physical keyboard 18 are an integral located on an upper surface of the physical keyboard 18. In other embodiments, the supporting plate 20 is located at a lower layer of the upper case of the physical keyboard 18. The supporting plate 20 of both embodiments is provided with the supporting housing 22*a*, and the supporting plate 20 is formed integrally with the supporting housings 22*a*. Apart from the keycap 12*a*, the supporting plate 20, and the supporting housing 22*a*, the physical keyboard 18 further includes components such as a first circuit board 28, a second circuit board 36*a*, an elastic component (such as a key switch 40 or a rubber dome 32), and a keyboard scanning circuit 60, which are described below.

Figure 6:
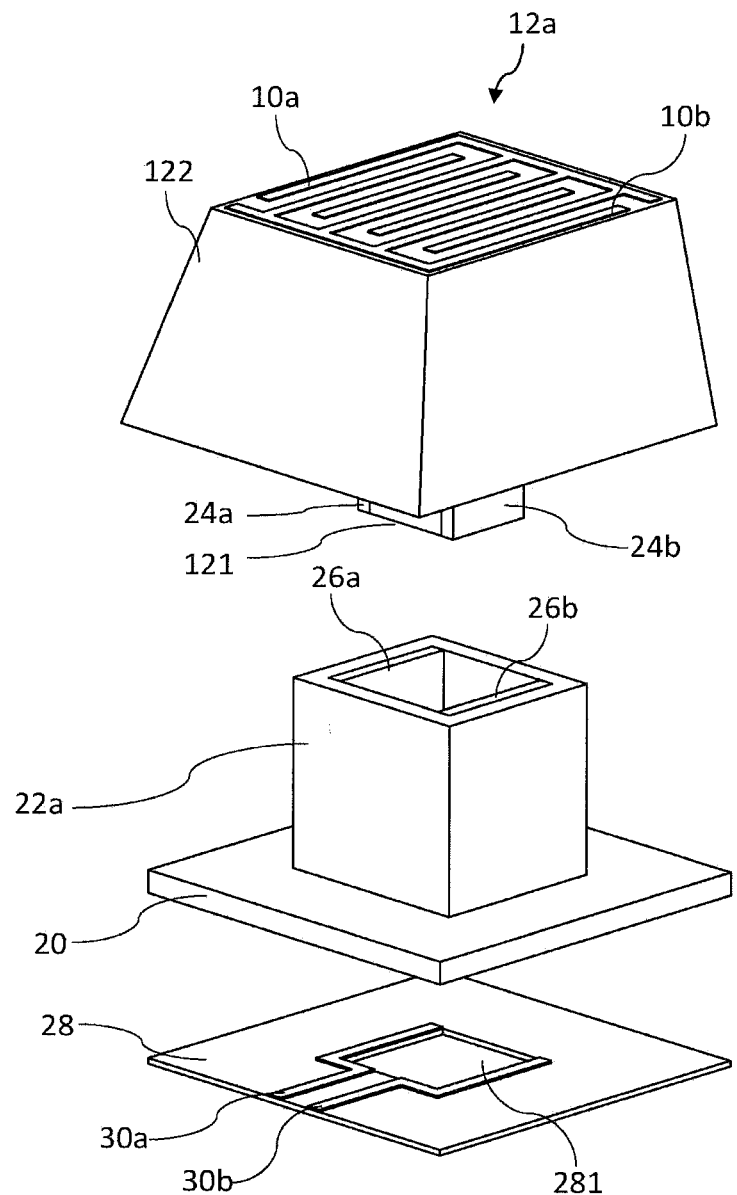
FIG. 6 is a schematic disassembled axonometric view from the keycap to a first circuit board of the physical keyboard according to the first embodiment of the present invention.

Referring to FIG. 6, FIG. 6 is a schematic disassembled axonometric top view from the keycap 12*a* to a first circuit board 28 of the physical keyboard 18 according to the first embodiment of the present invention. To make the figure clearer, full views of the supporting plate 20 and the first circuit board 28 are not completely drawn herein. The keycap 12*a* is mushroom-shaped and includes a keycap column 121 located in a lower end of the keycap 12*a* and a cap 122 fixed to an upper end of the keycap column 121. The supporting housing 22*a* is a hollow column having two openings at both ends. A tetragonal prism is used herein as an example, but in some embodiments, the supporting housing 22*a* may be a column of other geometric shapes, such as a cylinder. A lower end of the supporting housing 22*a* is a fixed end which is fixed to the supporting plate 20; and an upper end of the supporting housing 22*a* is an open end used to accommodate the keycap column 121 of the keycap 12*a* and can be combined to the keycap column 121, so that the keycap 12*a* is installed on the physical keyboard 18 after being assembled with the supporting housing 22*a*. The keycap column 121 may be hollow or solid, and a hollow keycap column 121 is used as an example here. An outer surface (that is, a surface neighboring to the supporting housing 22*a*) of the keycap column 121 is provided with a first conductive bar 24*a* and a second conductive bar 24*b* respectively corresponding to the positions of the through holes 16. In this case, the first conductive bar 24*a* and the second conductive bar 24*b* are disposed opposite to each other, that is, disposed on two opposite surfaces of the keycap column 121. An inner wall of the open end of the supporting housing 22*a* has a first conductive wall 26*a* and a second conductive wall 26*b*. Positions of the first conductive wall 26*a* and the second conductive wall 26*b* are disposed corresponding to positions of the first conductive bar 24*a* and the second conductive bar 24*b* of the keycap column 121. In a case when the keycap 12*a* is assembled on the supporting housing 22*a*, the first conductive wall 26*a* and the first conductive bar 24*a* are in mutual contact and electrically connected to each other; and the second conductive wall 26*b* and the second conductive bar 24*b* are in mutual contact and electrically connected to each other. The first conductive wall 26a runs through the supporting plate 20 and extends out of a bottom surface (that is, another surface opposite to the keycap 12a, and the surface facing the first circuit board 28) of the supporting plate 20; and the second conductive wall 26b runs through the supporting plate 20 and extends out of the bottom surface (that is, another surface opposite to the keycap 12a, and the surface facing the first circuit board 28) of the supporting plate 20.

Both the supporting housing 22a and the supporting plate 20 are made from a non-conductive material. In some embodiments, the supporting housing 22a and the supporting plate 20 are molded by means of plastic injection, and a conductive plate, such as a conductive plate made from a highly conductive polymer or a copper foil, is adhered to the inner wall (that is, the first conductive wall 26a and the second conductive wall 26b) of the supporting housing 22a. In some embodiments, a double shot mould injection manufacturing process may be used. A first-shot mould injection is performed on a non-conductive material (such as ABS) by using a supporting plate mould to manufacture the supporting plate 20 and the supporting housings 22a, and after the supporting plate 20 and the supporting housings 22a are molded, a second-shot mould injection is performed on a highly conductive material to manufacture the first conductive wall 26a and the second conductive wall 26b.

Figure 7:
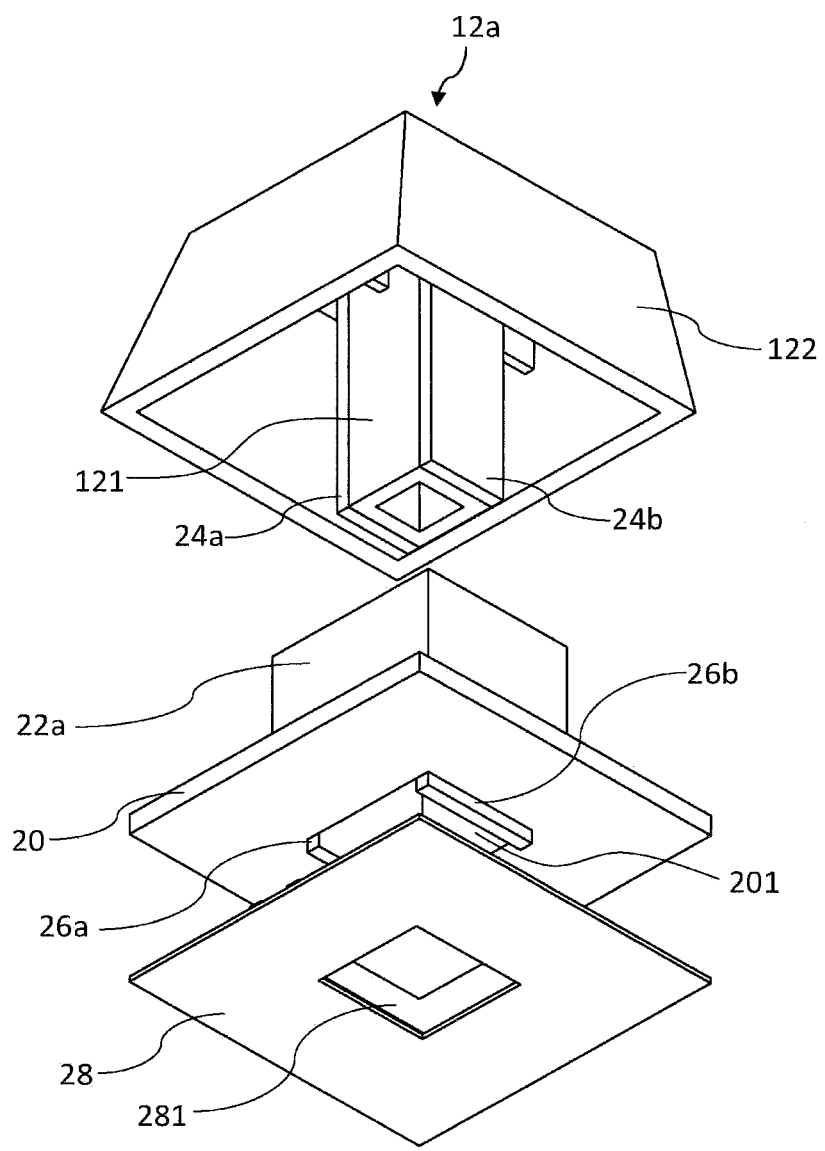
FIG. 7 is a schematic disassembled axonometric bottom view from the keycap to the first circuit board of the physical keyboard according to the first embodiment of the present invention.

FIG. 7 is a schematic disassembled axonometric bottom view from the keycap 12a to the first circuit board 28 of the physical keyboard 18 according to the first embodiment of the present invention. Referring to FIG. 6 and FIG. 7 together, FIG. 6 and FIG. 7 describe a conductive distribution from the touch key part 10 on the keycap 12a to the first circuit board 28. The conductive distribution is correspondingly disposed on the keycap 12a and the keycap column 121 fixed to each other and is electrically connected to the touch key part 10 of the keycap 12a. Specifically, the conductive distribution is mainly formed by the first conductive bar 24a, the second conductive bar 24b, the first conductive wall 26a, and the second conductive wall 26b described below and is electrically connected between the touch key part 10 and the first conductive wire 30a and second conductive wire 30b. The first detection electrode 10a is connected to the first conductive bar 24a by using a conductor inside the through hole 16. After the keycap 12a is assembled on the supporting housing 22a (the keycap column 121 at the lower end of the keycap 12a is assembled in the supporting housing 22a), the first conductive bar 24a is connected to the first conductive wall 26a, and the first conductive wall 26a runs through the supporting plate 20 and extends out of a bottom surface (that is, the surface facing the first circuit board 28) of the supporting plate 20. A lower part of the supporting plate 20 is provided with the first circuit board 28, of which a side neighboring to the supporting plate 20 is a circuit and a position corresponding to the keycap 12a is provided with the first conductive wire 30a and the second conductive wire 30b. When the circuit of the first circuit board 28 is upward attached to the lower part of the supporting plate 20, the first conductive wall 26a and the first conductive wire 30a are connected in conduction. Based on this, a 3-dimensional and movable conductive distribution is completed between the first detection electrode 10a and the first conductive wire 30a. A layout and a connection manner between the second detection electrode 10b and the second conductive wire 30b are the same as the layout and connection manner between the first detection electrode 10a and the first conductive wire 30a described above. A conductive distribution in an order of the second detection electrode 10b, the second conductive bar 24b and the second conductive wall 26b to the second conductive wire 30b can also be formed, and details are not described herein again. After assembling is completed, when a finger does not touch the keycap 12a, a coupling capacitor exists between the first detection electrode 10a and the second detection electrode 10b, and in this case, there is a fixed value of the capacitor. After the finger touches the keycap 12a, a change in the charges between the first detection electrode 10a and the second detection electrode 10b causes the value of the coupling capacitor to change. The conductive distribution between the touch key part 10 and the first circuit board 28 is electrically connected to a touch control determining unit 48 (shown in FIG. 14), so that the touch control determining unit 48 detects, by using the conductive distribution, a change in the value of the coupling capacitor caused by a touch of a user on the touch key part 10 of the keycap 12a, to generate a key signal (referred to as "a first key signal" below).

In some embodiments, to ensure good contact between the first conductive bar 24a and the first conductive wall 26a, and between the second conductive bar 24b and the second conductive wall 26b, that keystroke feelings are not affected when the first conductive bar 24a, the first conductive wall 26a, the second conductive bar 24b, and the second conductive wall 26b are excessively close to each other, not only precisely dimensional designing and manufacturing, and a coefficient of friction of a material from which a conductive bar and a conductive wall are made (under a condition when other factors are the same, the lower coefficient of friction relative to the two indicates smoother of the keystrokes) are considered, but also an appropriate amount of conductive ointment may further be added to increase contact areas of the two, reduce the coefficient of friction, and reduce the occurrence of air gaps. The conductive ointment is a thickening lubricant and includes a superfine conductive raw material (such as ultrafine copper powder).

In this embodiment, two sides of the inner wall of the supporting housing 22a, that are not neighboring, are provided with the first conductive wall 26a and the second conductive wall 26b (that is, the first conductive wall 26a and the second conductive wall 26b are correspondingly disposed), corresponding to the positions of the first conductive bar 24a and the second conductive bar 24b. In some embodiments, the first conductive wall 26a and the second conductive wall 26b may be disposed at two neighboring sides of the inner wall of the supporting housings 22a, or the same side of the inner wall. If the first conductive wall 26a and the second conductive wall 26b are at the same side, the first conductive wall 26a and the second conductive wall 26b are not connected to each other. However, no matter the first conductive wall 26a and the second conductive wall 26b are disposed at neighboring sides or sides that are not neighboring, or even on the same side, the first conductive wall 26a and the second conductive wall 26b need to be disposed corresponding to the first conductive bar 24a and the second conductive bar 24b.

Figure 8:
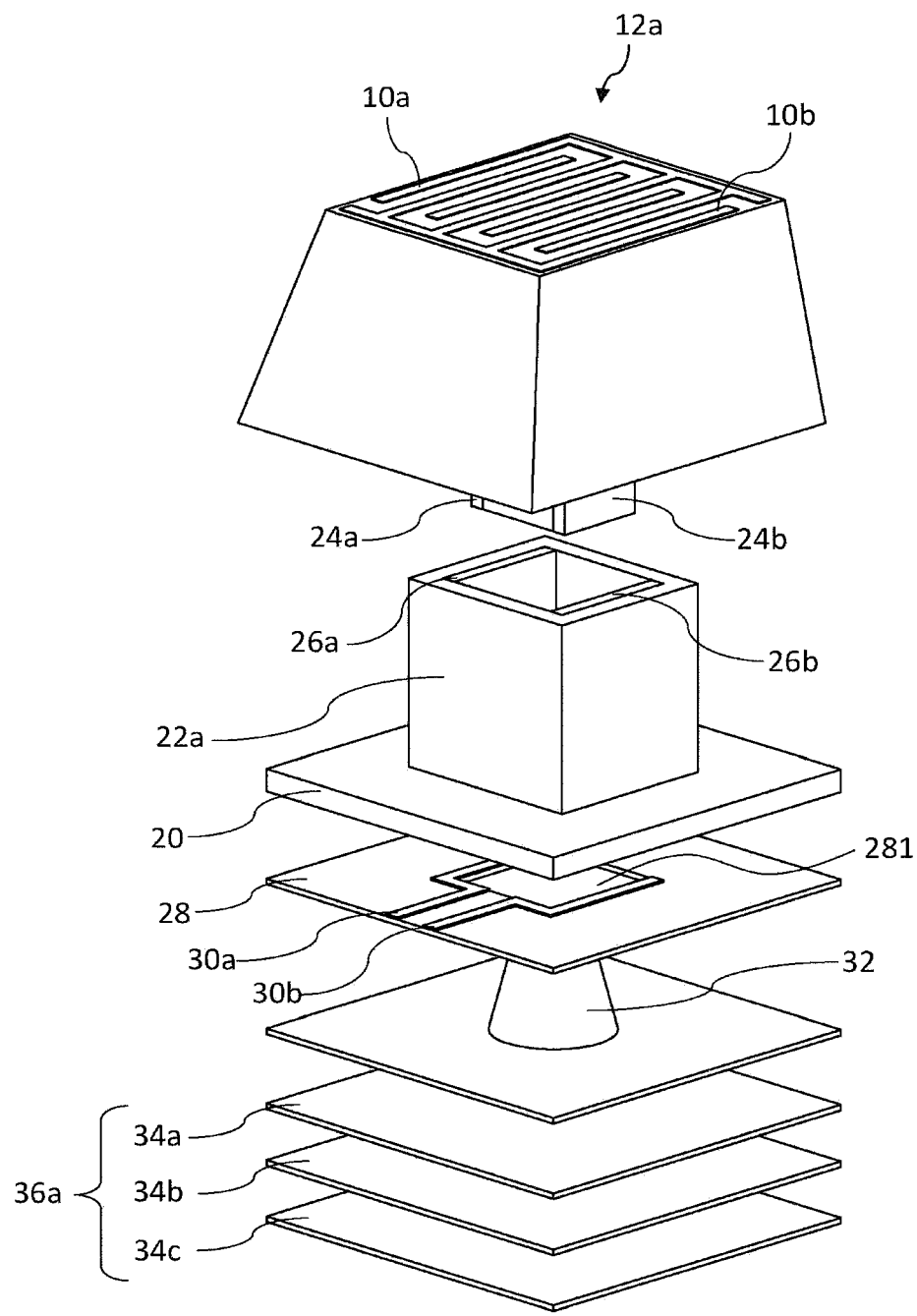
FIG. 8 is a schematic disassembled axonometric view from the keycap to a second circuit board of the physical keyboard according to the first embodiment of the present invention.
Figure 9:
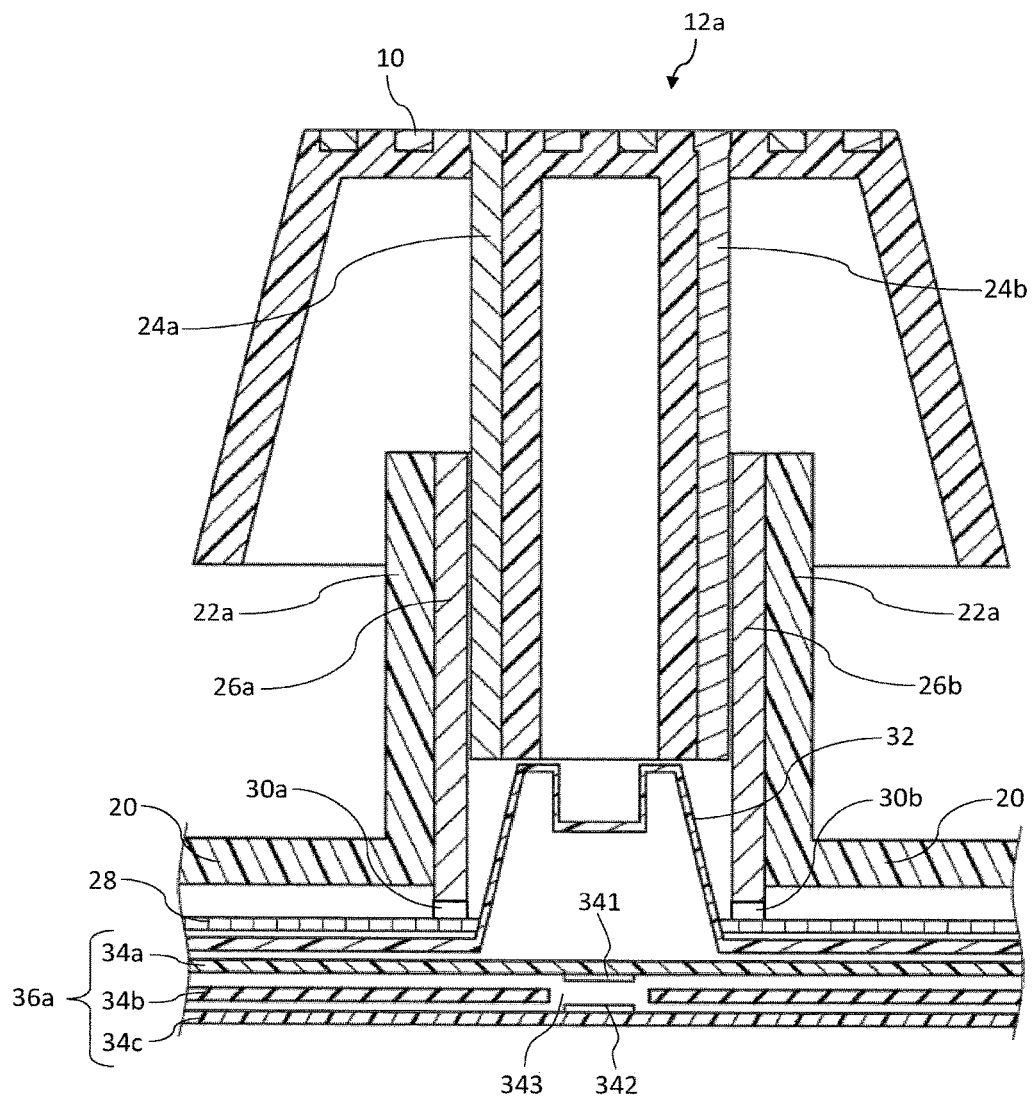
FIG. 9 is a sectional view from the keycap to the second circuit board of the physical keyboard according to the first embodiment of the present invention.

Refer to FIG. 8 and FIG. 9 together. FIG. 8 is a schematic disassembled axonometric view from the keycap 12a to a second circuit board 36a of the physical keyboard 18 according to the first embodiment of the present invention. FIG. 9 is a sectional view, along an A-A line of FIG. 4, from the keycap 12a to the second circuit board 36a of the physical keyboard 18 according to the first embodiment of the present invention. The conductive distribution between the touch key part 10 of the keycap 12a and the first circuit board 28 is described above, and details are not described herein again. The second circuit board 36a includes a plurality of key contact points and a plurality of elastic components configured respectively corresponding to the key contact points (herein, a rubber dome 32 is used as an example for description). Each elastic component receives squeezing of a corresponding keycap column 121, so that a corresponding key contact point is stressed and changes from a normally open state (non-conductive state) to a conductive state, by which the second circuit board 36a can generate a second key signal. Further descriptions are made below. The second circuit board 36a may include an upper layer thin film circuit board 34a, an insulating layer 34b, and a lower layer thin film circuit board 34c layered according to a sequence (the three are collectively referred to as the second circuit board 36a, that is, a thin film circuit board, also referred to as a membrane circuit board). The rubber dome 32 is disposed on above of the upper layer thin film circuit board 34a. A via 201 (shown in FIG. 7) is further provided at a position of the supporting plate 20 corresponding to the lower part of the keycap column 121, and a via 281 is also provided at a position of the first circuit board 28 corresponding to the lower part of the keycap column 121, so that when the keycap 12a is depressed, the keycap column 121 can move through the via 201 and 281 towards the second circuit board 36a, and further squeeze the rubber dome 32. In addition, the via 281 is located between the first conductive wire 30a and the second conductive wire 30b. A circuit of the upper layer thin film circuit board 34a is downward and a connection point 341 is disposed at a lower part of the upper layer thin film circuit board 34a corresponding to the rubber dome 32, and a circuit of the lower layer thin film circuit board 34c is upward and a connection point 342 is also disposed at a lower part of the lower layer thin film circuit board 34c corresponding to the rubber dome 32. The connection points 341 and 342 (collectively referred to as "key contact points") of the upper layer thin film circuit board 34a and the lower layer thin film circuit board 34c are separated by the insulating layer 34b. The insulating layer 34b is provided with an opening 343 at a position corresponding to the key contact points, that is, the connection points 341 and 342 of the upper layer thin film circuit board 34a and the lower layer thin film circuit board 34c are in normally open state. After a user depresses the keycap 12a, the keycap column 121 at the lower end of the keycap 12a squeezes down the rubber dome 32, so that the connection point 341 of the upper layer thin film circuit board 34a runs through the opening 343 of the insulating layer 34b and is connected to the connection point 342 of the lower layer thin film circuit board 34c, becoming a conductive state. In other words, the keycap 12a is depressed so that the key contact points of the second circuit board 36a are in the conductive state for the user to generate a key signal (that is, a second key signal) in a keystroke operation manner. The "keystroke" (that is, "depressing", or "depressing then releasing") includes key-down (generate a "Make Code") and key-up (generate a "Break Code") of a key. This embodiment is applicable to a thin film type keyboard, that is, the second circuit board 36b is a thin film type circuit board.

To describe that the first conductive wall 26a and the second conductive wall 26b run through the supporting plate 20 and extend out of the bottom surface of the supporting plate so as to be connected to the first conductive wire 30a and the second conductive wire 30b, extended parts of the first conductive wall 26a and the second conductive wall 26b, and thicknesses of the first conductive wire 30a and the second conductive wire 30b are deliberately highlighted herein, which causes an illusion that there is a large gap between the supporting plate 20 and the first circuit board 28 in the figure. Actually, the supporting plate 20 and the first circuit board 28 are closely attached to each other.

In some embodiments, the first conductive wire 30a and the second conductive wire 30b are directly wiring at a bottom side of the supporting plate 20 corresponding to another surface of the supporting housing 22a and are in conduction with the first conductive wall 26a and the second conductive wall 26b. That is, in this embodiment, the first circuit board 28 is integrated with the supporting plate 20, and the bottom side (that is, an original position of the first circuit board 28 in FIG. 9) of the supporting plate 20 is coated or attached with a thin film to protect the first conductive wire 30a and the second conductive wire 30b at the bottom side of the supporting plate 20.

Figure 10:
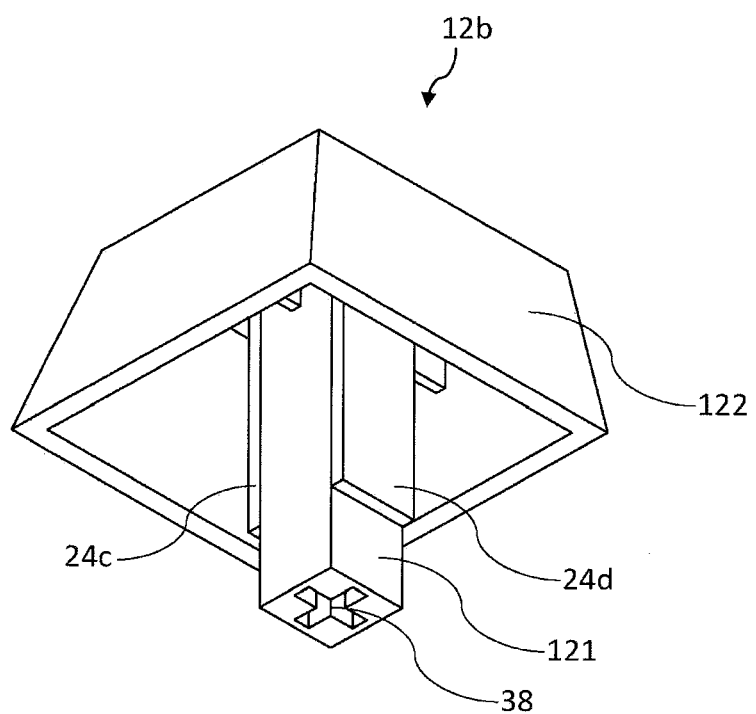
FIG. 10 is an axonometric bottom view of a keycap of a physical keyboard according to a second embodiment of the present invention.
Figure 11:
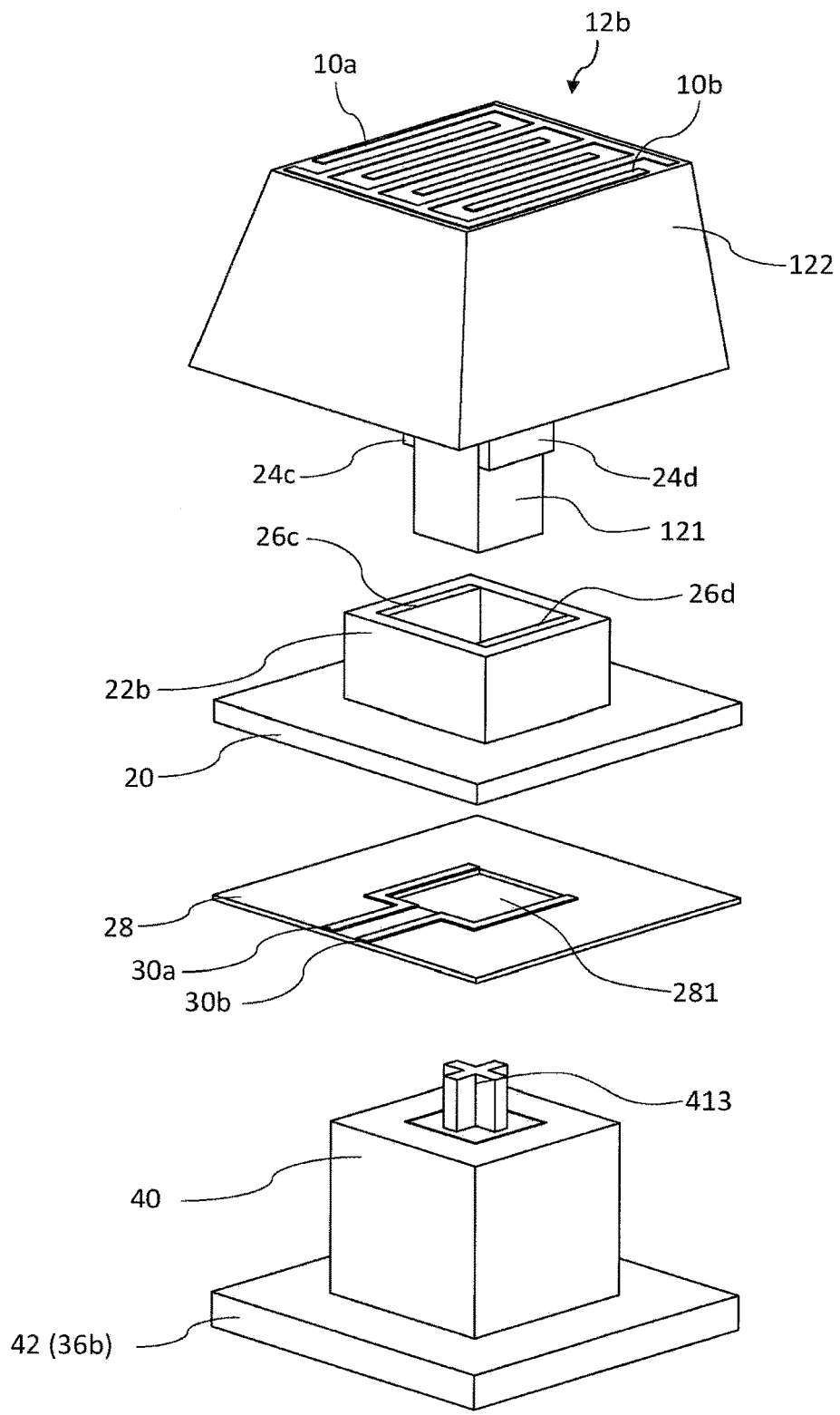
FIG. 11 is a schematic disassembled axonometric view from the keycap to a second circuit board of the physical keyboard according to the second embodiment of the present invention.
Figure 12:
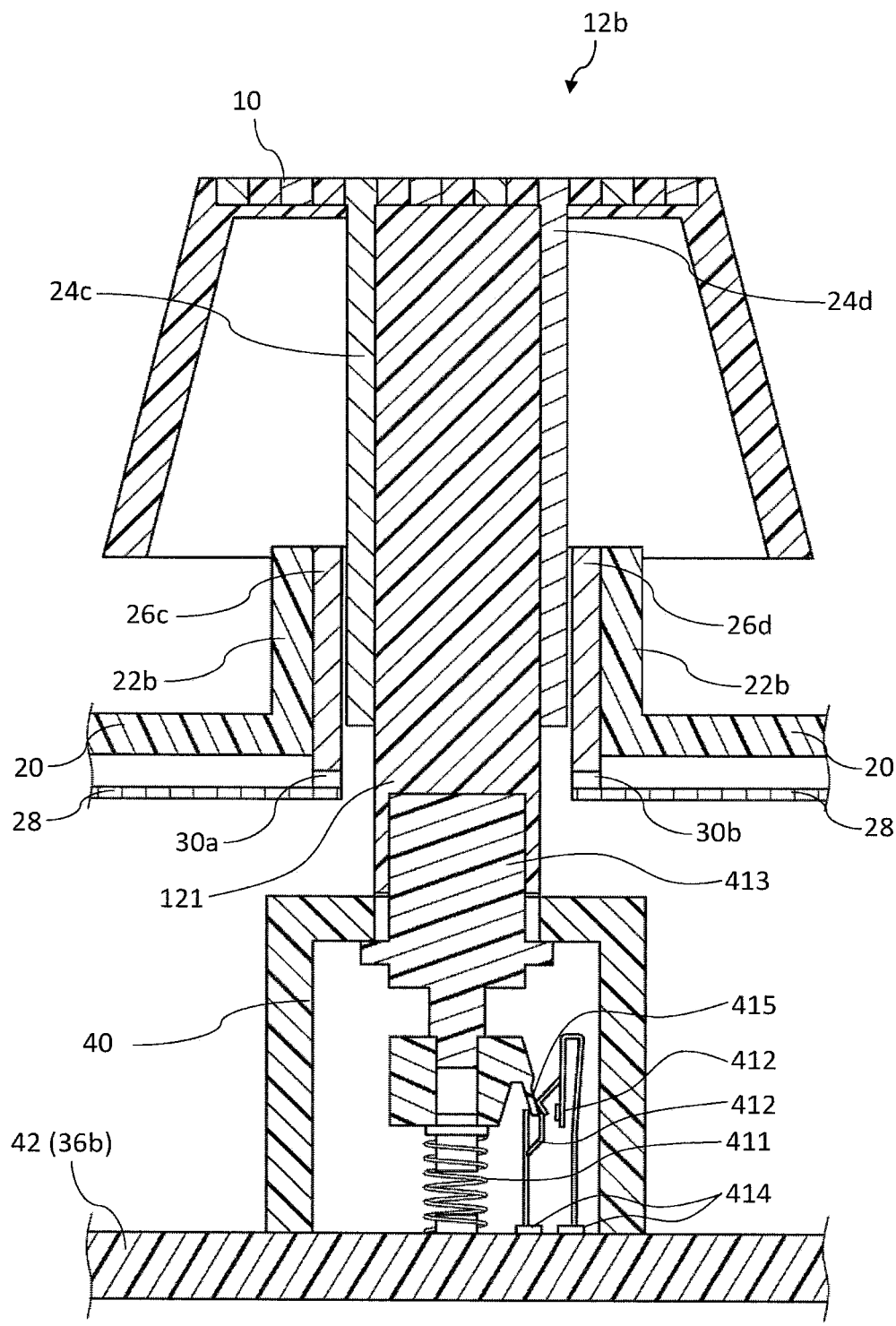
FIG. 12 is a sectional view from the keycap to the second circuit board of the physical keyboard according to the second embodiment of the present invention.

Referring to FIG. 10, FIG. 11, and FIG. 12, FIG. 10, FIG. 11, and FIG. 12 are schematic diagrams of a second embodiment of the present invention. Same parts of this embodiment and the first embodiment are represented by same structures and component symbols and are not described again. FIG. 10 is an axonometric bottom view of a keycap 12b of a physical keyboard 18 according to a second embodiment of the present invention. FIG. 11 is a schematic disassembled axonometric view from the keycap 12b to a second circuit board 36b of the physical keyboard 18 according to the second embodiment of the present invention. FIG. 12 is a sectional view (the same as FIG. 4, the section view taken along the A-A line of two through holes 16) from the keycap 12b to the second circuit board 36b of the physical keyboard 18 according to the second embodiment of the present invention. This embodiment is applicable to a mechanical keyboard, that is, the rubber dome 32 in the previous embodiment is replaced with a key switch 40 (also referred to as a mechanical switch). The upper layer thin film circuit board 34a, the insulating layer 34b, and the lower layer thin film circuit board 34c in the previous embodiment are replaced with a printed circuit board 42. A top end of the key switch 40 includes a stem 413 of the key switch. In this embodiment, the stem 413 of the key switch has a cross-shaped stem (also referred to as Cherry MX Mount), which is one of commonly-seen standard stems of the mechanical keyboard. To combine with the cross-shaped stem of the key switch 40, a cross groove 38 is provided at a lower end of the keycap column 121 of the keycap 12b in this embodiment. In some other embodiments, the stem 413 of the key switch 40 may also use a flat-shaped stem (also known as flat-head stem, not shown), and a flat-shaped groove (not shown) is provided at the lower end of the keycap column 121 of the keycap 12b. In other words, a groove fitting a shape of the stem 413 of the key switch 40 may be provided at the lower end of the keycap column 121 of the keycap 12b. The key switch 40 has accommodation space inside which can accommodate a spring 411 and two copper foils 412. Before the keycap 12b is depressed, the key switch 40 has an isolating branch 415 located between the two copper foils 412, so that the two copper foils 412 are non-conductive. When the keycap 12b is depressed, the keycap column 121 of the keycap 12b pushes down the stem 413 of the key switch 40 into the accommodation space, so that the two copper foils 412 inside the key switch 40 are in mutual contact and conductive. The copper foils 412 are respectively electrically connected to two key contact points (a key contact point 414 is in a normally open state) on the printed circuit board 42, so that the key contact point 414 is in a conductive state to generate a key signal (that is, a second key signal of the present invention, a "Make Code").

Later, when a finger moves away from the keycap 12b, the spring 411 inside the key switch 40 rebounds the stem 413 of the key switch 40 back to its original place (an original position), and the copper foil 412 also leaves the key contact point 414, that generates the second key signal again (that is, a "Break Code"). To ensure that the stem 413 can be pushed into the key switch 40, the first conductive bar 24c and the second conductive bar 24d in this embodiment are shorter than the first conductive 24a bar and the second conductive bar 24b in the previous embodiment, but still have enough contacting areas to be connected to the first conductive wall 26c and the second conductive wall 26d of the inner wall of the supporting housings 22b.

To describe that the first conductive wall 26c and the second conductive wall 26d run through the supporting plate 20 and extend out of the bottom surface of the supporting plate 20 so as to be connected to the first conductive wire 30a and the second conductive wire 30b, extended parts of the first conductive wall 26c and the second conductive wall 26d, and thicknesses of the first conductive wire 30a and the second conductive wire 30b are deliberately highlighted herein, which causes an illusion that there is a large gap between the supporting plate 20 and the first circuit board 28 in the figure. Actually, the supporting plate 20 and the first circuit board 28 are closely attached to each other.

In some embodiments, the first conductive wire 30a and the second conductive wire 30b are directly wiring at a bottom side of the supporting plate 20 corresponding to another surface of the supporting housing 22a and are in conduction with the first conductive wall 26c and the second conductive wall 26d. That is, in this embodiment, the first circuit board 28 is integrated with the supporting plate 20, and the bottom side (that is, an original position of the first circuit board 28 in FIG. 12) of the supporting plate 20 is coated or attached with a thin film to protect the first conductive wire 30a and the second conductive wire 30b at the bottom side of the supporting plate 20.

Figure 13:
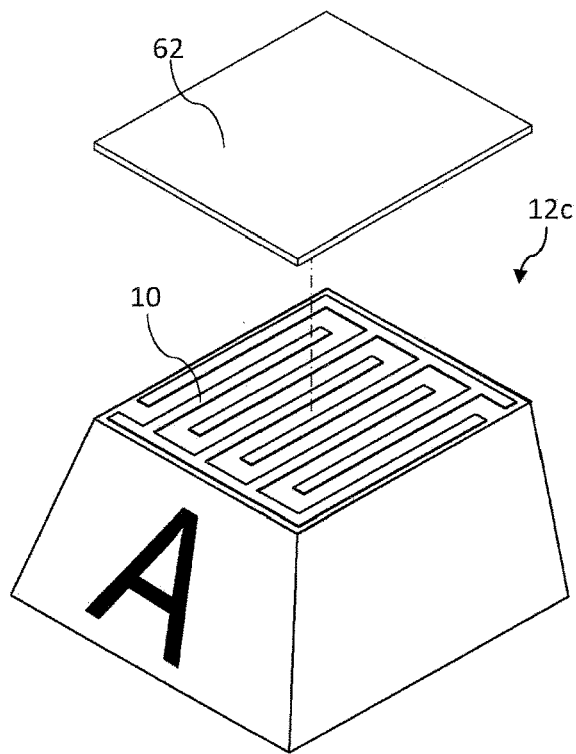
FIG. 13 is an axonometric view of a keycap of a physical keyboard according to a third embodiment of the present invention.

Referring to FIG. 13, FIG. 13 is schematic disassembled axonometric view of a keycap 12c of a physical keyboard 18 according to a third embodiment of the present invention. A letter/number/symbol mark (a letter "A" herein in capital) may be printed on a side surface (that is, a side facing a user) of the keycap 12c neighboring to the side of the touch key part 10. In addition, a covering layer 62 may also be disposed on the keycap 12c to protect the touch key part 10. In some embodiments, a letter/number/symbol mark represented by each key may be printed on the upper part (not shown) of the keycap 12c. In this case, a transparent or colored covering layer 62 may be disposed on the keycap 12c, and the letter/number/symbol mark represented by each key may be printed on the covering layer. Alternatively, the letter/number/symbol mark represented by each key may be printed on the keycap 12c first, and then a transparent covering layer 62 may be provided.

Figure 14:
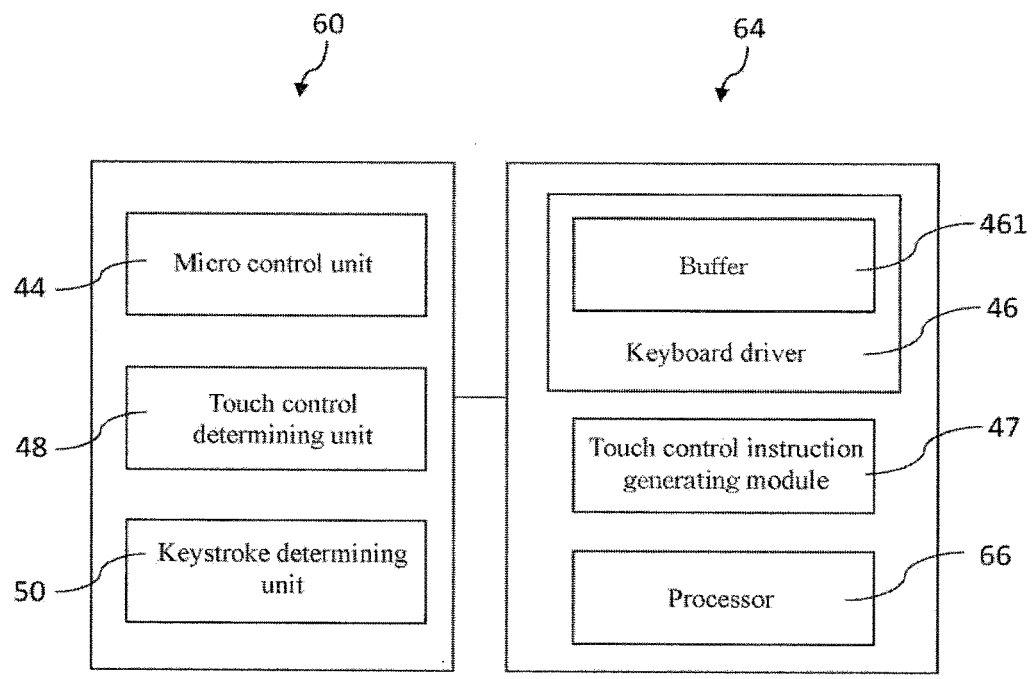
FIG. 14 is a systematic block diagram (1) of a keyboard scanning circuit of the physical keyboards and computing devices corresponding to the keyboard scanning circuit according to the first, the second, and the third embodiment of the present invention.
Figure 15:
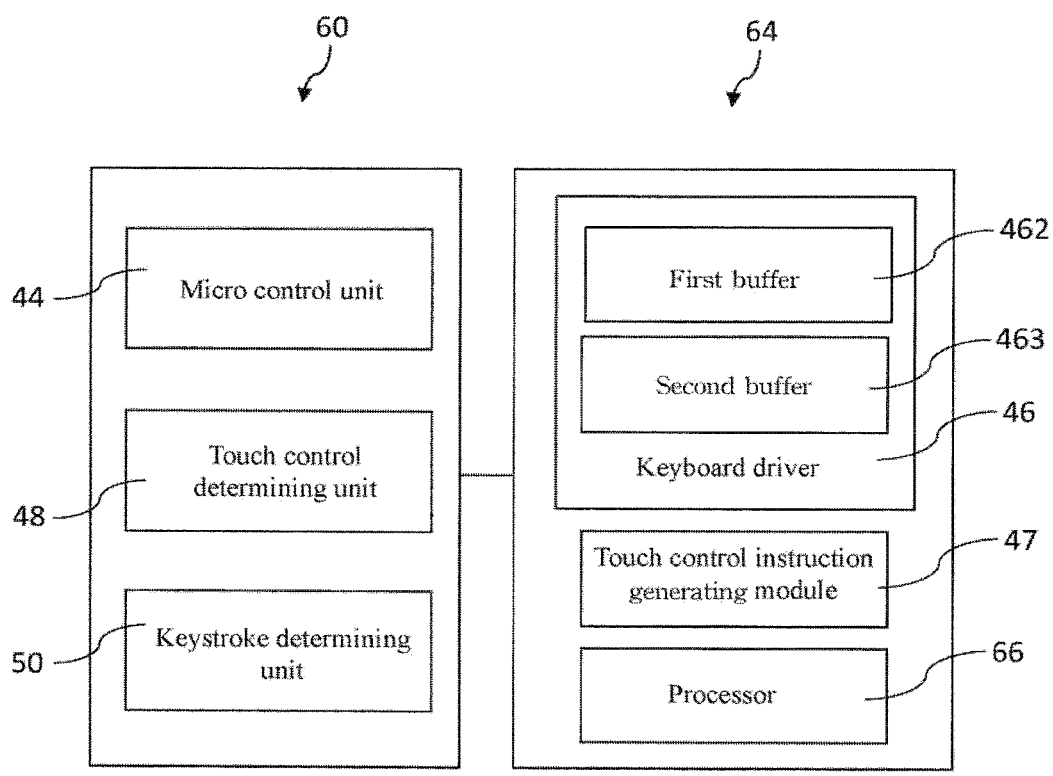
FIG. 15 is a systematic block diagram (2) of a keyboard scanning circuit of the physical keyboards and computing devices corresponding to the keyboard scanning circuit according to the first, the second, and the third embodiment of the present invention.
Figure 16:
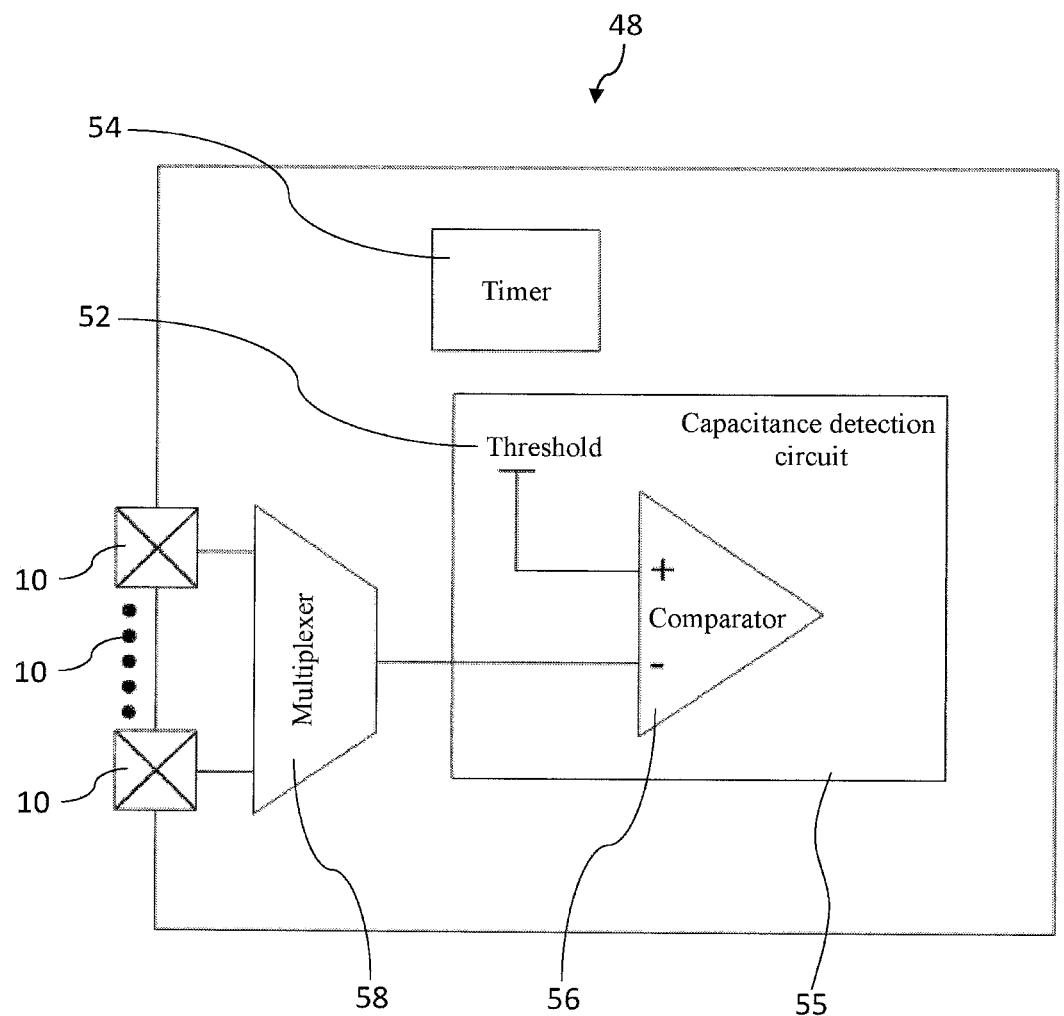
FIG. 16 is a circuit diagram of touch control determining units of the physical keyboards according to the first, the second, and the third embodiment of the present invention.

Referring to FIG. 14, FIG. 15 and FIG. 16 together, FIG. 14 and FIG. 15 are systematic block diagrams of keyboard scanning circuit 60 of the physical keyboards 18 and a computing devices 64 corresponding to the keyboard scanning circuit 60 according to the first, the second, and the third embodiment of the present invention, and FIG. 16 is a circuit diagram of a touch control determining unit 48 of the physical keyboard 18. The keyboard scanning circuit 60 may be located on a circuit board independent of the first circuit board 28 and the second circuit board 36b that are described above, or may be partially or integrally disposed on the first circuit board 28 or the second circuit board 36b. Position relationships between the keyboard scanning circuit 60 and the first circuit board 28 and the second circuit board 36b are not limited in this embodiment of the present invention. The keyboard scanning circuit 60 includes a micro control unit 44, a touch control determining unit 48, and a keystroke determining unit 50, which may have independent circuits or may be integrated together, for example, implemented as a single integrated circuit (IC). The computing device 64 includes a processor 66 and a keyboard driver 46. The keyboard driver 46 is stored in a storage medium, such as a non-volatile memory, hard disk drive, a solid-state drive, or a memory card. The keyboard driver includes a buffer 461. The keyboard scanning circuit 60 is in communication connection with the computing device 64, that is, the physical keyboard 18 and the computing device 64 are in communication connection with each other. A communication connection method includes a 5-pin DIN connector (an AT/XT keyboard), a 6-pin Mini-DIN connector (a PS/2 keyboard), a USB connector (a USB keyboard), Bluetooth/RF/Wi-Fi (a wireless keyboard), etc.

The touch control determining unit 48 includes a timer 54 and a capacitance detection circuit 55 connected to each other. The capacitance detection circuit 55 includes a comparator 56. A method for comparing changes in capacitance values by the capacitance detection circuit 55 includes a relaxation oscillator (alternatively referred to as an RC oscillation method) detection, charge transfer (alternatively referred to as comparison of charges) or continuous approximation (alternatively referred to as capacitance coupling analog conversion by using a capacitance-to-voltage convertor and an analog-to-digital convertor). If relaxation oscillator detection is used, the timer 54 is configured to calculate an RC oscillation frequency or period. If the charge transfer or the continuous approximation is used, the timer 54 is configured to time a charging time of the coupling capacitor. The touch control determining unit 48 is electrically connected to conductive wire 30a and 30b corresponding to each keycap 12a, 12b, or 12c and is configured to compare changes (which may virtually be changes in voltage of corresponding ends or changes in oscillation frequencies/periods) in values of the coupling capacitor of the keycap 12a, 12b, or 12c according to a threshold 52. When the changes exceed a threshold 52, it is determined that the keycap 12a, 12b, or 12c is detected to be touched, and a first key signal is generated. The threshold 52 may be set as a certain voltage value (not described in detail herein) by using a bleeder circuit, or the value (or a terminal voltage value or an oscillation frequency) of the coupling capacitor converted by using the analog-to-digital convertor in a digital manner is compared with the threshold set as the certain value.

The micro control unit 44 stores the first key signal to the buffer 461 by using the keyboard driver 46 and sends an interrupt request to the processor 66 of the computing device 64. The first key signal includes the code corresponding to the keycap 12a, 12b, or 12c. Subsequently, the processor 66 of the computing device 64 responds to the interrupt request and reads the first key signal from the buffer 461, so that the processor 66 can tell which one of the keycap 12a, 12b, or 12c is touched. The buffer 46 uses first-in first-out (FIFO) data structure.

The keystroke determining unit 50 is electrically connected to the connection points 341 and 342 alternatively referred to as the key contact point 414, corresponding to each keycap 12a, 12b, or 12c, and is configured to detect changes in the connection points 341 and 342 (key contact point 414) from a normally open state to a conductive state due to keystrokes, to generate a second key signal. The micro control unit 44 stores the second key signal to the buffer 461 by using the keyboard driver 46 and sends an interrupt request to the processor 66 of the computing device 64. The second key signal includes the code corresponding to the keycap 12a, 12b, or 12c. Subsequently, the processor 66 of the computing device 64 responds to the interrupt request and reads the second key signal from the buffer 461, so that the processor 66 can tell which one of the keycap 12a, 12b, or 12c is depressed.

In some embodiments, as shown in FIG. 15, a difference between FIG. 15 and FIG. 14 is that the buffer 461 is replaced with two independent buffers: a first buffer 462 and a second buffer 463. That is, the first key signal and the second key signal are respectively stored in the first buffer 462 and the second buffer 463 which are used to distinguish data types in the first buffer 462 and the second buffer 463 when the processor 66 of the computing device 64 performs reading.

In some embodiments, after the first key signal is stored to its dedicated first buffer 462, the processor 66 of the computing device 64 is not notified in a manner of sending an interrupt request, but the processor 66 of the computing device 64 automatically reads the first buffer 462 dedicated to the first key signal in a polling manner at set intervals. Similarly, after the second key signal is stored to its dedicated second buffer 463, the processor 66 of the computing device 64 can automatically read the second buffer 463 dedicated to the second key signal in a polling manner at set intervals.

In some embodiments, the touch control determining unit 48 further includes a multiplexer 58 electrically connected to the capacitance detection circuit 55, so that all or a part of touch key parts 10 share the timer 54 and the capacitance detection circuit 55, and the timer 54 and the capacitance detection circuit 55 are not repeatedly disposed.

In some embodiments, wiring on the first circuit board 28, connected to the first conductive wire 30a and the second conductive wire 30b corresponding to each keycap 12a, 12b, or 12c uses a matrix architecture and detects values of coupling capacitors corresponding to the keycaps 12a, 12b or 12c in a row/column scanning manner, to improve efficiency of the pins utilization of the touch control determining unit 48. That is, by means of the matrix architecture, quantity of connections of the conductive wires between the touch control determining unit 48 and the touch key parts 10 on the keycaps 12a, 12b, or 12c can be dramatically reduced.

It should be noted that the embodiments of the present invention are not intended to limit all keys on the physical keyboard 18 according to components of the foregoing structure. If a part of keys do not need a touch function, a conventional structure of a common key may also be used. In addition, the touch key part 10 and the conductive distribution (that is, the first conductive bars 24a and 24c, the second conductive bars 24b and 24d, the first conductive walls 26a and 26c, and the second conductive walls 26b and 26d) may be made from highly conductive materials, such as Indium Tin Oxide (ITO), Highly Conductive Polymer, Silver Nanowires, Metal Mesh, Graphene, and Carbon Nanotubes.

In conclusion, the physical keyboard 18 provided in the embodiments of the present invention receives a first key signal generated after a touch and a second key signal generated after a keystroke by using the first circuit board 28 and the second circuit boards 36a and 36b, so that a user can operate in a keystroke manner and a touch manner by using physical keys of the same physical keyboard 18, avoiding troubles of respectively generating two types of key signals by using two different apparatuses.

A method for recognizing a touch control instruction of a keyboard, and a computer program product and a non-transitory computer readable medium of the touch control instruction described below in the present invention are implemented by using the apparatuses in the above-described embodiments and a computing device. In addition to the keyboard driver 46 described above, the computer program product further comprises a touch control instruction generating module 47 which may be loaded and executed by a processor 66 (as shown in FIG. 14). The touch control instruction generating module 47 includes an instruction condition definition table, used to determine which touch control instruction corresponds to a touch control event formed by multiple consecutive first key signals. In other words, the touch control instruction generating module 47 is configured to: read multiple consecutive first key signals, recognize a touch control event, and separately compare the touch control event with multiple touch control instructions each including multiple instruction conditions. If the touch control event matches all instruction conditions of a touch control instruction, the touch control instruction is generated and transferred to be executed by the processor 66. The touch control instruction is used to manipulate applications executed on a computing device 64, such as closing a window, scrolling content of a window, enlarging/contracting content of a window, and rotating content of a window.

How the touch control instruction generating module 47 reads the first key signals is described herein. In some embodiments, the touch control instruction generating module 47 directly reads the first key signals from a buffer 461 according to a sequence to perform consecutive comparison, and transfer the read first key signals to the processor 66 for simultaneously performing other subsequent job (for example, generating first key marks to be displayed on an on-screen keyboard, which is described later). In some embodiments, the touch control instruction generating module 47 directly reads the first key signals according to a sequence from a first buffer 462 that is dedicated to the first key signals, for consecutive comparison, and transfers the read first key signals to the processor 66 for simultaneously performing other subsequent job. In some embodiments, the first key signals are read by another middle agent according to a sequence from a buffer 461 or a first buffer 462, and the middle agent transfers the read first key signals to the touch control instruction generating module 47 for performing continuous comparison job.

In some embodiments, the conditions of an instruction comprises an initial quantity, a moving direction, an area, an initial position, a moving distance, a valid period, and a special condition. Each condition is preset with a definition value (or referred to as a condition value) to be compared by the touch control instruction generating module 47 with a currently obtained detection value. The initial quantity is the "quantity of touched keycap 12a, 12b, or 12c at an initial time". Because the touch control instruction may define a one-finger touch control operation and a multiple-finger touch control operation, the quantity of the touched keycap 12a, 12b, or 12c at the initial time needs to be distinguished. In some embodiments, the initial quantity of the instruction condition is only defined as two cases, "one-finger touch control" and "multiple-finger touch control". Therefore, the touch control instruction generating module only needs to determine whether a touch control event is performed by one finger or by multiple fingers. For example, only keycap 12a, 12b, or 12c of a "key J" is touched, a detection value of the initial quantity is "1", satisfying a one-finger condition. If keycaps 12a, 12b, or 12c of the "key J" and a "key K" are simultaneously touched, a detection value of the initial quantity is "2", satisfying a multiple-finger condition. If keycaps 12a, 12b, or 12c of the "key J", the "key K", and a "key L" are simultaneously touched, a detection value of the initial quantity is "3", also satisfying a multiple-finger condition. In some embodiments, the initial quantity of the instruction condition may be defined as multiple cases such as "one-finger touch control", "two-finger touch control", and "three-finger touch control". For example, only keycap 12a, 12b, or 12c of a "key J" is touched, a detection value of the initial quantity is "1", satisfying a one-finger condition. If keycaps 12a, 12b, or 12c of the "key J" and a "key K" are simultaneously touched, a detection value of the initial quantity is "2", satisfying a two-finger condition. If keycaps 12a, 12b, or 12c of the "key J", the "key K", and a "key L" are simultaneously touched, a detection value of the initial quantity is "3", satisfying a three-finger condition. Other cases can be derived by analogy.

The moving direction is a "moving direction when fingers perform touching". The moving direction is determined by using a first touched keycap as an origin (that is, an initial position), and by means of "a next touched keycap" and "next two touched keycaps". In some embodiments, it is defined that of the moving direction of the instruction condition is determined by means of two neighboring keycaps. A layout of a QWERTY-arranged keyboard is used as an example for description (examples below all use the same keyboard layout, but the present invention is not limited thereto). For example, keycap 12a, 12b, or 12c of a "key J" is touched, that is, the "key J" is considered as an origin, and then keycap 12a, 12b, or 12c of a "key K" neighboring to the "key J" is touched, so that the touch control instruction generating module obtains a detection value of "moving to the right". In some embodiments, it is defined that the moving direction of the instruction condition is determined by means of next two consecutive keycaps which are neighboring to each other and are in the same direction. For example, the keycap 12a, 12b, or 12c of the "key J" is touched, that is, the "key J" is considered as an origin, and then, the keycap 12a, 12b, or 12c of the neighboring "key K" is touched. In this case, the touch control instruction generating module considers a detection value of a first stage as "moving to the right", and then the touch control instruction generating module continue to perform tracking. Later, keycap 12a, 12b, or 12c of a neighboring "key L" is touched, that is, a detection value of a second stage is also "moving to the right". The touch control instruction generating module finally determines the moving direction as "moving to the right" until the third consecutive keycap 12a, 12b, or 12c is touched, and detection values of moving directions of the intermediate two stages are the same. Tracing of each touch control event traced by the touch control instruction generating module is suspended when the touch control event matches a comparison condition, or when a next keycap is not moved to when a preset valid period (for example, a preset valid period is 500 milliseconds) is passed, or when a keystroke operation occurs (which generating a second key signal), or when definition conditions are violated (for example, a next touched keycap is not neighboring to a previously touched keycap, or a moving direction of the second stage is different from that of the first stage). Determining of a one-finger moving direction is described above. There are two methods for determining a multiple-finger moving direction. In some embodiments, if multiple keycaps are simultaneously touched, when fingers move, the touch control instruction generating module simultaneously monitors multiple touch control events. If a touch control event of any finger matches a condition, a moving direction of the finger may be determined. For example, assuming it is defined that the moving direction of the instruction condition is determined by next two consecutive keycaps that are neighboring to each other and in the same direction, when a user simultaneously touches keycaps 12a, 12b, or 12c of the "key J", the "key K", and the "key L" respectively by using his first finger, middle finger, and ring finger, the touch control instruction generating module considers the "key J", the "key K", and the "key L" as three origins and three touch control events. Then, if keycaps 12a, 12b, or 12c of the "key K", the "key L", and a "key ;" are simultaneously touched, in this case, a detection value of a moving direction of the first stage is "rightward". The three touch control events are continued to be traced. Later, if only keycaps 12a, 12b, or 12c of the "key L" and the "key ;" are simultaneously touched, it may be that the first finger leaves halfway, or may be that the ring finger leaves halfway. But whatever, a detection value of a moving direction of the second stage can still be considered as "rightward", because for the touch control instruction generating module, a touch control event with keycaps 12a, 12b, or 12c of the "key J" as an origin matches "moving to next two consecutive keycaps that are neighboring to each other and in the same direction", and is thereby determined as matching the condition. In some embodiments, when multiple keycaps are simultaneously touched, the touch control instruction generating module considers moving in the same direction as the same touch control event having multiple origins. When the fingers move from the origins to neighboring keycaps 12a, 12b, or 12c that are touched next, a detection value of a moving direction of the first stage may be obtained, and then the fingers move to neighboring keycaps 12a, 12b, or 12c that are touched next, and a detection value of a moving direction of the second stage may be obtained. If detection values of the two stages are the same, the touch control instruction generating module may determine the moving direction.

The area is "a key section on the keyboard 18 touched by fingers". Using a standard Windows keyboard as an example for description, definition values of the area includes alphanumeric keys, function keys, modifier keys, numeric keys, and a qwerty keyboard (that includes all the four parts). The alphanumeric keys include number keys, English letter keys, shift keys, symbolic keys, a space key, a backspace key, a caps-lock key, a new line key (or referred to as an enter key), manipulation keys, and conversion keys. The function keys include twelve function keys located at the first row of the keyboard 18. The numeric keys include a number-lock key, number keys, mathematical symbol keys, an enter key, and a decimal point key that are located at the rightmost end of the keyboard 18. The modifier keys include arrow keys, an insert key, a delete key, a return key, an end key, a skip key, a page-up key, and a page-down key. When an area condition of an instruction is limited to a particular area, it represents that a touch control event occurs in the particular area is determined to be valid. For example, if a "window operation closing instruction" is limited to being valid only in the numeric keys, and it would be invalid when occurs in the alphanumeric keys. Dividing areas to receive different touch control instructions can effectively improve efficiency of monitoring touch control events by the touch control instruction generating module, reduce instruction misjudgments, and lower hardware resource consumption of the computing device 64 (such as computing resources of the processor 66).

The initial position refers to whether an origin (first touched keycap 12a, 12b, or 12c) needs to start from a designated particular key, for example, from the first three rows of the numeric keys, or from the middle two columns of the alphanumeric keys, or from two outer sides of the alphanumeric keys, or from any key.

The moving distance is "the quantity of keycaps 12a, 12b, or 12c that are in the same direction and consecutively touched" and is, for example, greater than or equal to (>=) three keys. If a condition of the moving distance is defined excessively short (a definition value is excessively small), misjudgments by the touch control instruction generating module 47 may easily be caused, but if the condition of the moving distance is defined excessively long (the definition value is excessively large), a user may probably consider it is not easy for operation (for example, fingers slide to an edge of an area, but still a distance required in the condition is not reach).

The valid period refers to a "longest time interval between two of neighboring keycaps 12a, 12b, or 12c that are touched". For example, a preset definition value of the valid period is 500 milliseconds. When a period during which two of neighboring keycaps 12a, 12b, or 12c are continuously touch exceeds the preset definition value, tracing of the touch control event is suspended.

The special condition is applicable to combinations of relatively complicated conditions, such as two groups (that is, two hands with each one using at least one finger) moving in opposite directions, a distance of two keys drawn near inwardly, a distance of two keys expanded outwardly, etc.

Below is partial content of an instruction condition definition table of an embodiment. Definition values in the instruction condition definition table are used for exemplary description but are not used to limit the present invention. Referring to Table 1, Table 1 is the instruction condition definition table. A corresponding touch control instruction can be generated only when all conditions in the field of "instruction conditions" are matched after comparison. If a definition value of a condition is "null" or "any key", comparison may be neglected. If a definition value of a condition is "horizontal", it represents that an obtained detection value may be "leftward" or "rightward". Content in the field of "execution" is a job transferred to be executed by the processor 66 after a touch control instruction is generated. An "active window" is a window that is currently used, and "window content" is a view. For example, window content of a photo browsing program is a view of a photo, and enlarging, contracting, or rotating window content represents enlarging, contracting, or rotating the photo.

TABLE 1

|  | Instruction conditions | Execution |
| --- | --- | --- |
| Horizontal scrolling instruction | Initial quantity = 1<br>Moving direction: horizontal<br>Area: alphanumeric keys<br>Initial position: any key<br>Moving distance: >=3<br>Valid period: <=500 ms<br>Special condition: null | To scroll a horizontal scrolling bar of an active window according to a moving direction of a touch control instruction |
| Vertical scrolling instruction | Initial quantity = 1<br>Moving direction: vertical<br>Area: alphanumeric keys<br>Initial position: any key<br>Moving distance: >=3<br>Valid period: <=500 ms<br>Special condition: null | To scroll a vertical scrolling bar of an active window according to a moving direction of a touch control instruction |
| Program switching instruction | Initial quantity: >1<br>Moving direction: horizontal<br>Area: function keys<br>Initial position: any key<br>Moving distance: >=3<br>Valid period: <=500 ms<br>Special condition: null | To switch another program in execution to be an active window |
| Program closing instruction | Initial quantity >1<br>Moving direction: downward<br>Area: numeric keys<br>Initial position: first three rows<br>Moving distance: >=3<br>Valid period: <=500 ms<br>Special condition: null | To close an active window (ends program) |
| Window contraction instruction | Initial quantity = 1<br>Moving direction: downward<br>Area: numeric keys<br>Initial position: first three rows<br>Moving distance: >=3<br>Valid period: <=500 ms<br>Special condition: null | To minimize an active window |
| Window enlarging instruction | Initial quantity = 1<br>Moving direction: upward<br>Area: numeric keys<br>Initial position: last three rows<br>Moving distance: >=3<br>Valid period: <=500 ms<br>Special condition: null | To maximize an active window |
| Content enlarging instruction | Initial quantity: >1<br>Moving direction: horizontal<br>Areas: alphanumeric keys, not including keys on a row of a | To Enlarge content of an active window |

TABLE 1-continued

| | Instruction conditions | Execution |
|---|---|---|
| | space key<br>Initial position: two columns of T and Y in the middle<br>Moving distance: >=3<br>Valid period: <=500 ms<br>Special condition: a distance of two keys expanded outwardly | |
| Content contraction instruction | Initial quantity: >1<br>Moving direction: horizontal<br>Areas: alphanumeric keys, not including a space key<br>Initial position: two outer sides<br>Moving distance: >=3<br>Valid period: <=500 ms<br>Special condition: a distance of two keys drawn near inwardly | To contract content of an active window |
| Rotate instruction | Initial quantity: >=4<br>Moving direction: vertical<br>Areas: alphanumeric keys, not including a space key<br>Initial position: any key<br>Moving distance: >=3<br>Valid period: <=500 ms<br>Special condition: two groups moving in vertically opposite directions | To rotate content of an active window clockwise or counterclockwise according to a moving direction of a touch control instruction |

The "content enlarging instruction" in Table 1 is used as an example to describe definition values of conditions of the content enlarging instruction. The content enlarging instruction in this embodiment needs to be operated by using at least one finger of each hand, such as a first finger of a left hand and a first finger of a right hand, and therefore, an initial quantity is greater than 1. A moving direction is horizontal, that is, the touched keycaps 12a, 12b, or 12c must be in the same row. A valid area is limited to alphanumeric keys but does not include a row of a space key. That is, only three rows of letter keys and a row of number keys, altogether four rows may be operated. An initial position starts from columns T and Y in the middle. That is, initial keys need to be a "key 5" and a "key 6", or a "key T" and a "key Y", or a "key G" and a "key H", or a "key B" and a "key N", altogether four pairs may be used as initial positions. A moving distance is greater than or equal to 3, that is, the content enlarging instruction is executed only when three neighboring keys are consecutively touched. A valid period is less than or equal to 500 ms, that is, time intervals of all touched keycaps 12a, 12b, or 12c need to be less than or equal to 500 ms. A special condition is a distance of two keys expanded outwardly. Using the pair of the "key G" and the "key H" as an example, a first step is that the left first finger touches "key G", and the right first finger touches the "key H". A second step is that the left first finger touches a "key F", and the right first finger touches a "key J". A third step is that the left first finger touches a "key D", and the right first finger touches a "key K". A fourth step is that the left first finger touches a "key S", and the right first finger touches a "key L". When content of an active window is a photo, in the first step, a size of the photo is unchanged. In the second step, the size of the photo is still unchanged. In the third step, because the moving distance of the instruction condition is satisfied, the photo is enlarged by 25% of its original size, and in the fourth step, the photo is continuously enlarged by 50% of its original size. The four steps in the above-described example are consecutive actions, and time intervals of touching keys do not exceed the definition value of the valid period. If a user intends to continuously enlarge the photo, after the fourth step, the user may continuously expand the distance outwardly using fingers, or start from the beginning and repeat operations from the first step to the fourth step.

Figure 17:
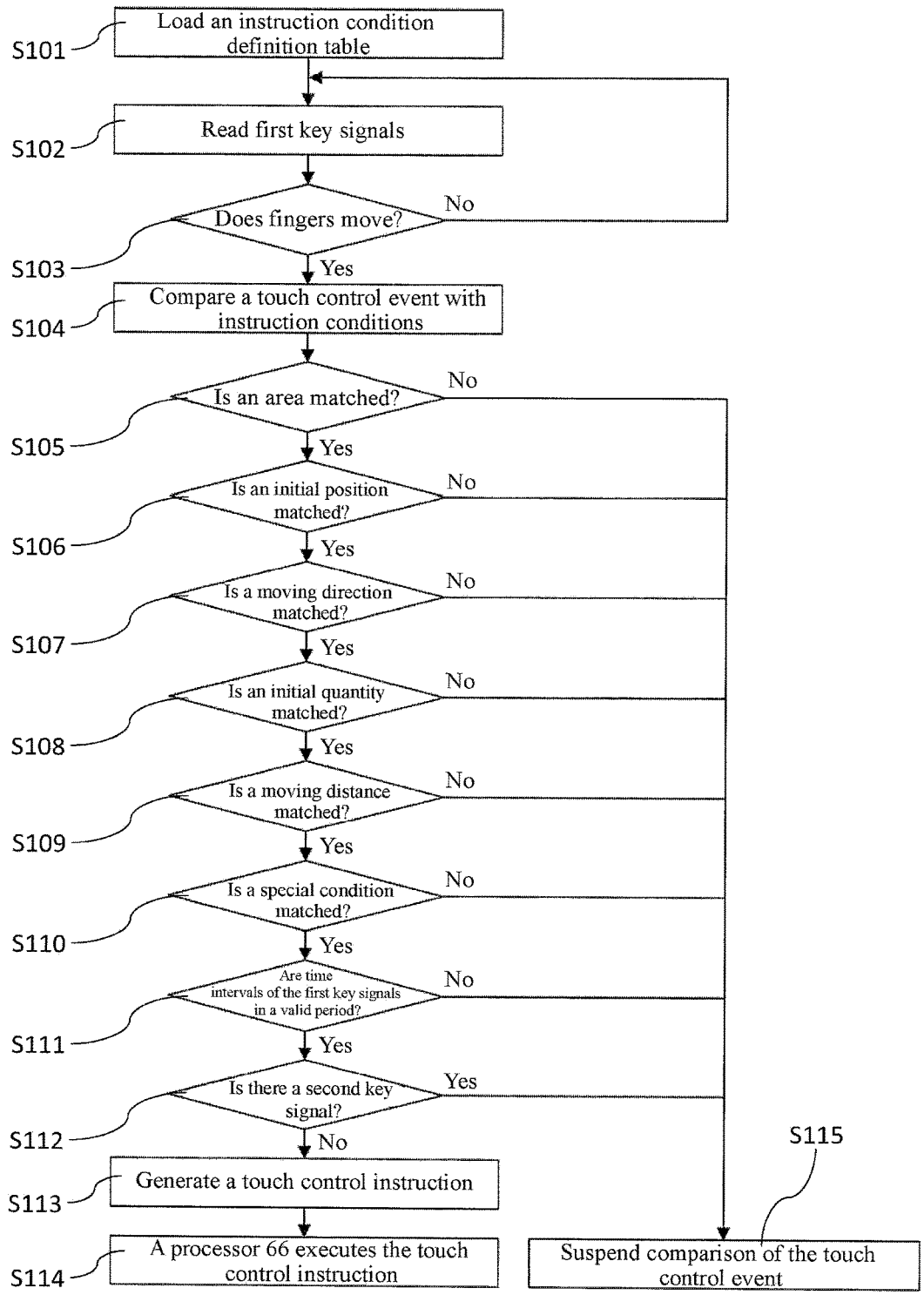
FIG. 17 is an operational flowchart of generating a touch control instruction according to an embodiment of the present invention.

Referring to FIG. 17, FIG. 17 is an operational flowchart of generating a touch control instruction according to an embodiment of the present invention and describes operational procedures of reading first key signals and continuing to compare default definition values after the touch control instruction generating module reads instruction conditions. The operational procedures include the following steps:

Step S101: Load an instruction condition definition table. A touch control instruction generating module 47 includes an instruction condition definition table, and the touch control instruction generating module 47 loads the instruction condition definition table to internal memory of a computing device 64.

Step S102: Read first key signals. The touch control instruction generating module 47 reads the first key signals from a buffer 461 or a first buffer 462 according to a sequence, or a middle agent reads the first key signals from the buffer 461 or the first buffer 462 according to a sequence, and then the middle agent transfers the read first key signals to the touch control instruction generating module 47 for performing consecutive comparison job.

Step S103: Determine whether fingers move. The touch control instruction generating module 47 determines whether fingers move according to the read first key signals and determines whether to perform consecutive comparison of a new touch control event. A first key signal represents a touched keycap 12a, 12b, or 12c. A series of (multiple and consecutive) first key signals represents multiple touched keycaps 12a, 12b, or 12c. Because the buffer 461 or the first buffer 462 uses first-in first out (FIFO) data structure and a processor 66 reads the first key signals "according to a sequence", "a series of first key signals" has meanings of time sequences. The touch control instruction generating module 47 determines whether fingers consecutively touch two neighboring keycaps within a valid period according to the touched keycaps 12a, 12b, or 12c and their relative positions and time sequences. If "two neighboring keycaps are consecutively touched within a valid period", two first key signals are considered to have connections. Multiple consecutive first key signals having connections are considered to be a new touch control event. In other words, the touch control instruction generating module 47 recognizes a touch control event according to multiple consecutive first key signals. In this case, the touch control event is started to be traced. The "tracing" means to keep obtaining multiple detection values used for continuous comparison of definition values of various conditions. In some embodiments, the first key signal further includes timestamps used for recording a precise occurrence time. In some embodiments, a touch control determining unit 48 times by using a timer 54, whether time intervals of a series of first key signals are within a valid period and marked with flags. In some embodiments, the touch control instruction generating module times by using a second timer, whether time intervals of first key signals stored in the buffer 461 or the first buffer 462 are in a valid period. If the fingers do not move, go back to the previous step S102 and read new first key signals again. If the fingers move, proceed to step S104.

Step S104: Compare a touch control event with instruction conditions. In the previous step, when the touch control instruction generating module 47 determined that the fingers moved, the touch control instruction generating module 47 starts consecutive comparison of a new touch control event and compares multiple detection values obtained earlier with the definition values of the instruction conditions. For example, when "multiple consecutive first key signals" represent a new touch control event, a first one of the first key signals represents that if an area to which keycap 12*a*, 12*b*, or 12*c* belong is alphanumeric key, an area detection value of the touch control event is "alphanumeric keys", and the first one of the first key signals represents that the keycap 12*a*, 12*b*, or 12*c* is an initial position. If no other first key signal is generated with the first one of the first key signals at the same time, an initial quantity detection value of the touch control event is "1".

Step S105: Determine whether an area is matched. The touch control instruction generating module 47 compares an area detection value with the definition values to narrow a comparison range. For example, when an area detection value of the touch control event is "alphanumeric keys", a touch control instruction occurs at numeric keys, function key, and modifier keys may be omitted in comparison job performed later and only a touch control instruction that is allowed to occur at the alphanumeric keys are compared. If the area is not matched, jump to step S115. If the area is matched, jump to step S106.

Step S106: Determine whether an initial position is matched. The touch control instruction generating module 47 compares an initial position detection value of the touch control event with the definition values. If the initial position is not matched, jump to step S115. If the initial position is matched, jump to step S107.

Step S107: Determine whether a moving direction is matched. The touch control instruction generating module 47 compares a moving direction detection value of the touch control event with the definition values. If the moving direction is not matched, jump to step S115. If the moving direction is matched, jump to step S108.

Step S108: Determine whether an initial quantity is matched. The touch control instruction generating module 47 compares an initial quantity detection value of the touch control event with the definition values. If the initial quantity is not matched, jump to step S115. If the initial quantity is matched, jump to step S109.

Step S109: Determine whether a moving distance is matched. The touch control instruction generating module 47 compares a moving distance detection value of the touch control event with the definition values. If the moving distance is not matched, jump to step S115. If the moving distance is matched, jump to step S110.

Step S110: Determine whether a special condition is matched. The touch control instruction generating module 47 compares a special condition detection value of the touch control event with the definition values. If the special condition is not matched, jump to step S115. If the special condition is matched, jump to step S111.

Step S111: Determine whether time intervals of the first key signals are within a valid period. The touch control instruction generating module 47 checks whether time intervals of the first key signals included in the touch control event are within the valid period. If the time intervals of the first key signals are within the valid period, jump to step S115. If the time intervals of the first key signals are within the valid period, jump to step S112.

Step S112: Determine whether there is a second key signal. The touch control instruction generating module 47 checks the buffer 461 or the second buffer 463. If there is a second key signal, jump to step S115. If there is no second key signal, proceed to step S113. While the touch control instruction generating module 47 traces the touch control event in progress, if a keystroke operation occurs (generating a second key signal), it represents that the first key signals, fingers touched the keycaps 12*a*, 12*b*, or 12*c* not for performing an operation by means of a touch control instruction but for typing data. Therefore, tracing of the touch control event is suspended.

Step S113: Generate a touch control instruction. If the touch control event matches the conditions during the condition comparison performed in step 105 to step 112, the touch control instruction generating module 47 generates a touch control instruction.

Step S114: A processor 66 executes the touch control instruction. After a touch control instruction is generated, the touch control instruction generating module 47 transfers the touch control instruction to the processor 66 for execution.

Step S115: Suspend comparison of the touch control event, that is, stop tracing of the touch control event.

The operational flowchart of generating a touch control instruction according to an embodiment is described above. The steps of condition comparison may be arranged in different sequences in different embodiments. Different instruction conditions used for comparison may be used in other different embodiments. The present invention is not limited to the sequence of the procedures and the instruction conditions described above. In some embodiments, a touch control instruction may split into multiple phases (stages), for example, a starting phase, a moving phase, and an ending phase. The touch control event of such an instruction keeps being tracked until the ending phase, while the processor 66 is executing each phase of the instruction. So the processor 66 may be executing one of the phases of the instruction while the comparison jobs are still in-progress.

In some embodiments, the computer program product additionally includes an on-screen virtual keyboard which is alternatively referred to as an on-screen keyboard (OSK) in Microsoft Windows operating systems. The on-screen keyboard in this embodiment is a computer program installed on a computing device 64 and executed by a processor 66, to display a keyboard layout, a first key mark, a second key mark, and a touch control operation track.

Figure 18:
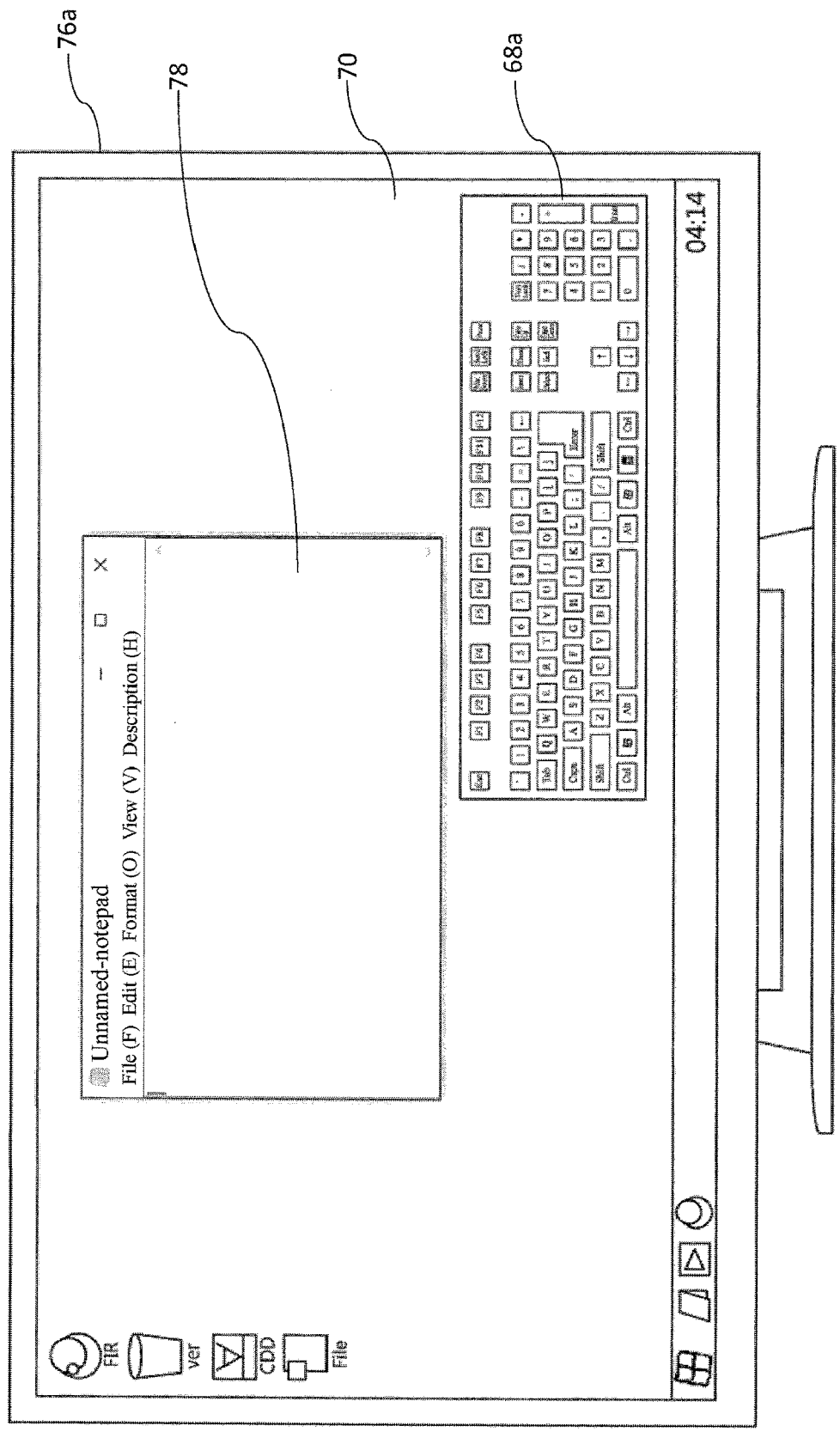
FIG. 18 is a schematic diagram (1) of an on-screen keyboard according to a first embodiment of the present invention.

Referring to FIG. 18 to FIG. 22, FIG. 18 to FIG. 22 are schematic diagrams of an on-screen keyboard 68a according to a first embodiment of the present invention. FIG. 18 describes displaying of the on-screen keyboard 68a of this embodiment on a screen 76a of a computing device 64. After execution, the on-screen keyboard 68a is located at a topmost layer (that is, a view attribute is set as "Topmost") of an operating system desktop 70, that is, even if windows of other applications are displayed at the same position of the on-screen keyboard 68a, the windows still do not block displaying of the on-screen keyboard 68a. A keyboard layout of the on-screen keyboard 68a is drawn corresponding to a layout of a physical keyboard 18 (shown in FIG. 20), to avoid that the on-screen keyboard 68a is excessively different from real keys in positions resulting in that the user is not adapted to the on-screen keyboard 68a. An active window 78 is a third-party application, and is a notepad herein.

Figure 19:
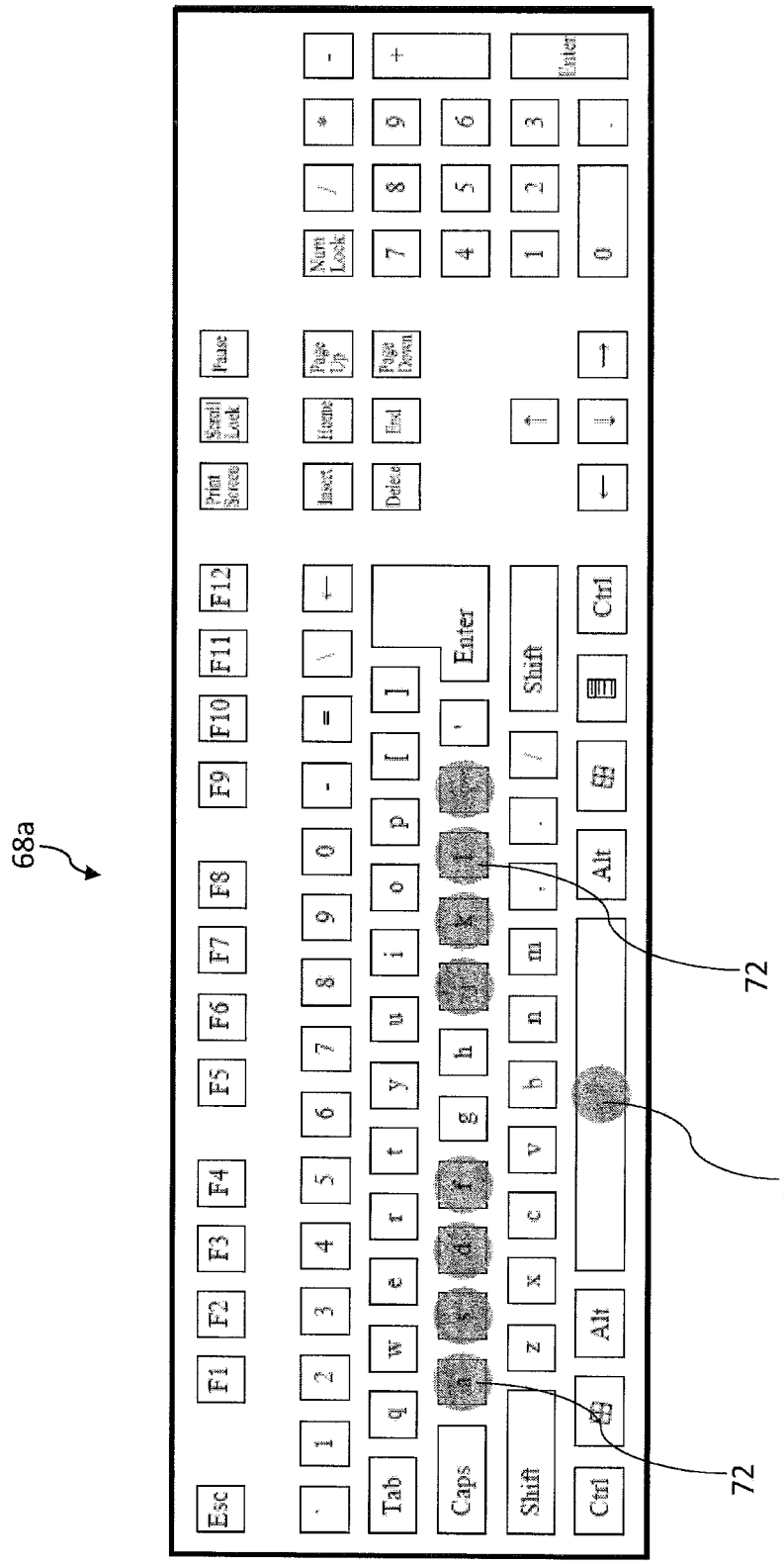
FIG. 19 is a schematic diagram (2) of the on-screen keyboard according to the first embodiment of the present invention.

FIG. 19 is an enlarged schematic diagram of the on-screen keyboard 68a and describes that when fingers of a user are touching the keycaps 12a, the on-screen keyboard 68a displays the first key marks 72 corresponding to the touched keycaps 12a. Herein, the marked positions of the first key marks 72 includes a "key A", a "key S", a "key D", a "key F", a "key J", a "key K", a "key L", a "key ;" and a "space key".

Figure 20:
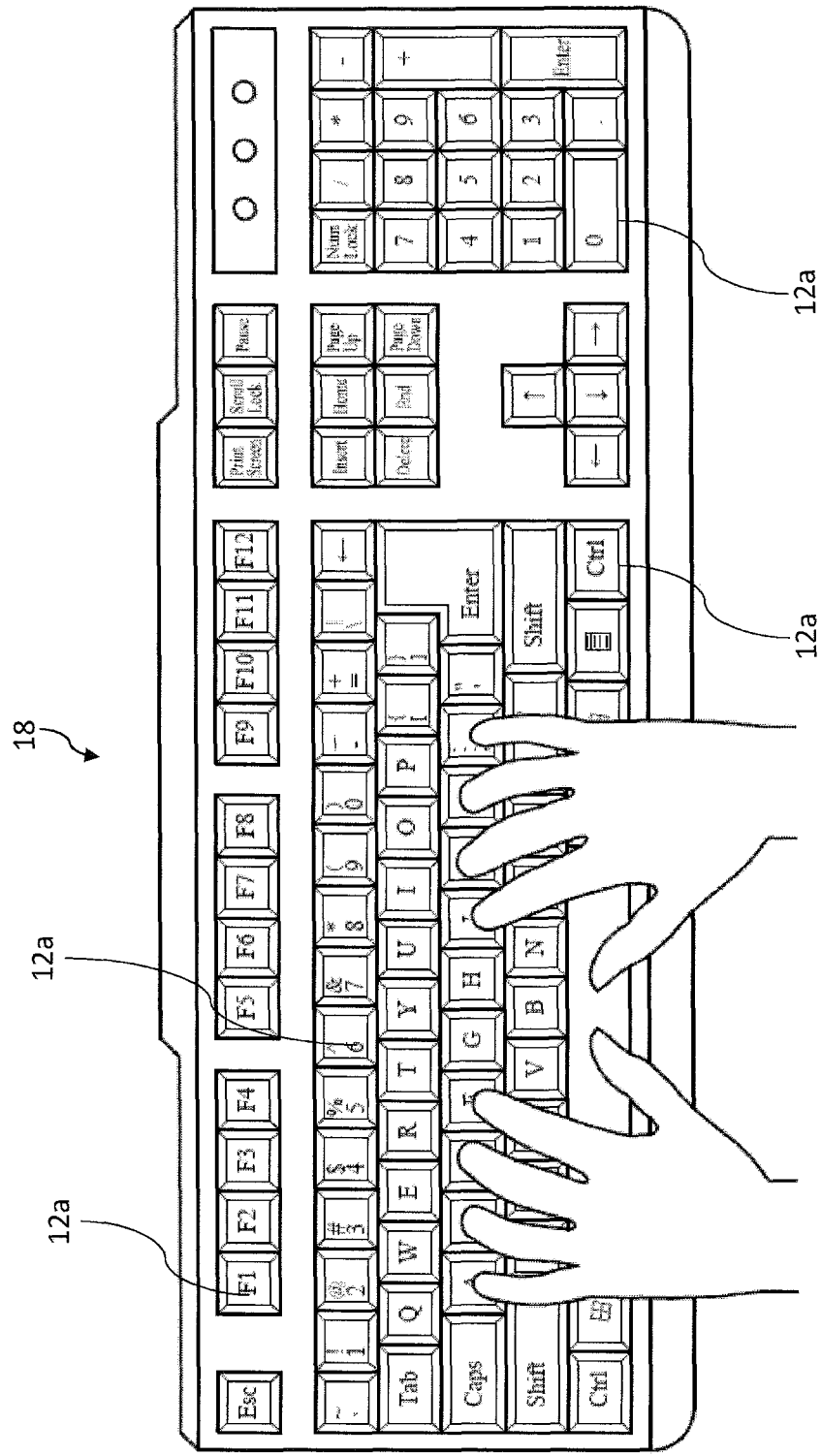
FIG. 20 is a schematic diagram (3) of the on-screen keyboard according to the first embodiment of the present invention.

FIG. 20 corresponds to FIG. 19. FIG. 20 describes keycaps 12a of the "key A", the "key S", the "key D", the "key F", the "key J", the "key K", the "key L", the "key ;" and the "space key" on the physical keyboard 18 are touched by the fingers of the user. When the fingers of the user are touching the keycaps 12a but not depressing the keys, in this case, the positions of the fingers are referred to as the "finger standby position" or the "finger ready position".

Figure 21:
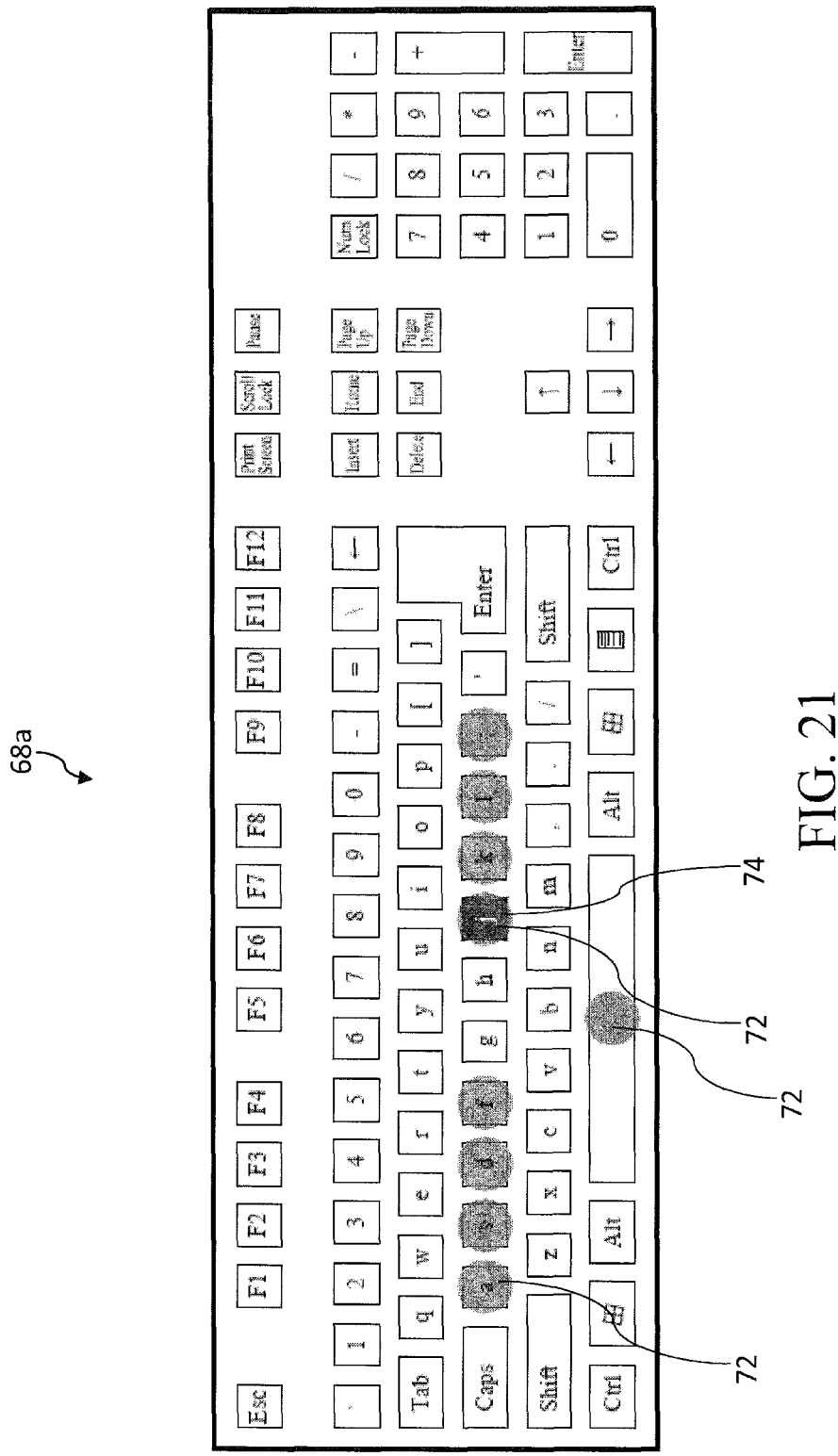
FIG. 21 is a schematic diagram (4) of the on-screen keyboard according to the first embodiment of the present invention.

FIG. 21 describes that the "key J" on the on-screen keyboard 68a is marked with both the first key mark 72 and a second key mark 74, that is, when the fingers of the user are touching the keycaps 12a of the "key A", the "key S", the "key D", the "key F", the "key J", the "key K", the "key L", the "key ;" and the "space key" on the physical keyboard 18, the finger of the user is depressing the keycap 12a of the "key J". In other words, not only the keycap 12a of the "key J" is touched to generate a first key signal, but also the keycap 12a of the "key J" is depressed to generate a second key signal (that is, a "Make Code"). This case occurs when the keycap 12a of the "key J" is depressed down (the "Make Code" is generated), but the keycap 12a of the "key J" is not released (a "Break Code" is not yet generated). When typing is performed at a normal speed, the second key mark 74 exists on the on-screen keyboard 68a for a considerably short time (or referred to as a display time) which is usually less than one second or even less than one tenth of a second and is a flashing to human eyes.

Theoretically, it must be that the fingers first touch the keycaps 12a and then depress the keycaps 12a. If typing is performed at a relatively fast speed, and the finger does not touch the keycap 12a until a keystroke, the first key signal and the second key signal (that is, a "Make Code") of the same key are "almost" generated simultaneously (there is still a difference in time between the first key signal and the second key signal, but the difference might be counted in milliseconds). That is, the first key mark 72 and the second key mark 74 of the same key are displayed "almost" simultaneously (human eyes are not easy to perceive a difference in time so as to feel that the first key mark 72 and the second key mark 74 of the same key are simultaneously displayed) on the on-screen keyboard 68a. However, when the majority persons (specifically those who type with two hands in correct fingering) type, before depressing keys (for example, when the persons are considering which word is to be used), the persons are accustomed to placing fingers at the "home keys" (or referred to as a Home Row, that is on the keycap 12a touched by the fingers shown in FIG. 20), or placing fingers on a will-be-pressed keycap 12a. Then, the keycap 12a is depressed. That is, sometimes, a first key mark 72 of a key is displayed obviously earlier than a second key mark 74 of the same key on the on-screen keyboard 68a. In addition to that second key marks 74 of a few keys (such as a "caps-lock key", a "number-lock key", and a "scroll-lock key" of a locking-key type or an "insert key" of a modifier key type) are separately displayed on the on-screen keyboard 68a and do not coexist with the first key marks 72, as to keystrokes (which generate "Make Code") on other keys, the first key marks 72 must be displayed earlier than the second key marks 74, or both the first key marks 72 and the second key marks 74 are almost simultaneously displayed on the on-screen keyboard 68a, and a case in which the second key marks 74 are separately displayed without the first key marks 72. Visually, human eyes can obviously discriminate a difference between two overlapped marks and a single mark (using FIG. 22 as an example). Although the second key mark 74 is only a flashing to the human eyes, the second key mark 74 (shown in the top of FIG. 22) that exists separately is obvious different from two overlapped marks (shown in the bottom of FIG. 22), and specifically when the marks of two different colors are displayed in an overlapped manner, the upper-layer mark with incomplete transparency, will generate a visual effect of a third color is The human eyes can obviously distinguish a difference between the third color and colors of the two marks. Therefore, a principle that "the second key mark 74 cannot be separately displayed" can be used as an inspection mechanism visually. When a second key mark 74 of a key is separately displayed on the on-screen keyboard 68a, it represents "occurrence of an error" (for example, there is a fault/failure in capacitive sensing, resulting in that an untouched key generates a first key signal, or a touched key does not generate a first key signal), and a user may be reminded to take a notice. In some embodiments, the on-screen keyboard 68a has an automatically alerting mechanism. When a second key mark 74 of a key is separately displayed on the on-screen keyboard 68a, the on-screen keyboard 68a pops up an alerting box and displays error information, such as "touch control sensing error, please re-correct touch control sensing". Because the second key mark 74 is only a flashing, and in some embodiments, only the first key mark 72 is marked on the on-screen keyboard 68a to display a finger standby position without the second key mark 74, the on-screen keyboard 68a directly omits processing of the second key signal, as shown in FIG. 19. In some embodiments, the on-screen keyboard 68a has a setting of correcting sensitivity of touch control sensing. The correction method may be that the on-screen keyboard 68a is displayed on the screen 76a and a test mark is marked on a designated key to remind a user to touch a designated keycap 12a corresponding to the test mark on the physical keyboard 18. After the steps are repeated for several times, an average value of coupling capacitance is calculated, and a threshold 52 of the physical keyboard 18 is reset by using the keyboard driver 46 so as to adjust sensitivity of capacitive sensing.

Figure 22:
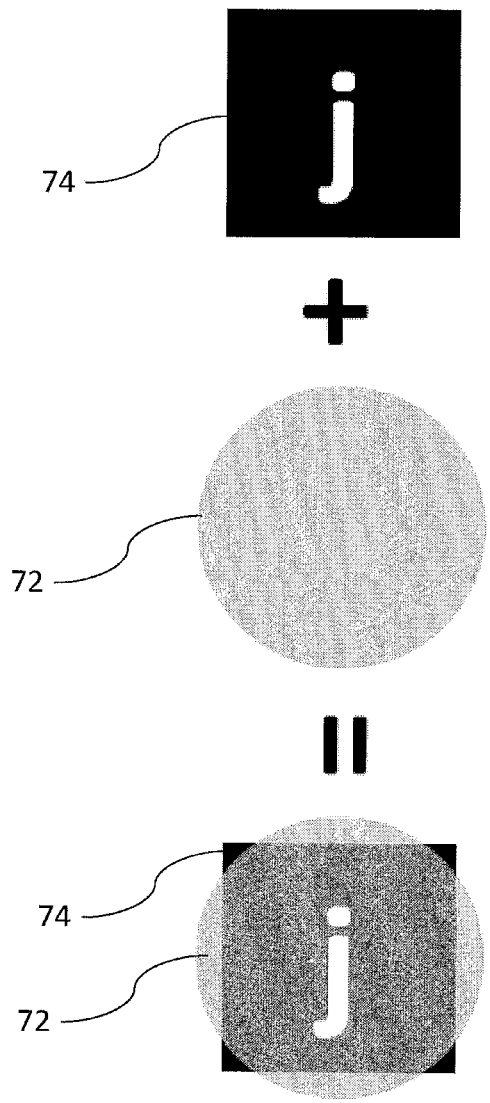
FIG. 22 is a schematic diagram (5) of the on-screen keyboard according to the first embodiment of the present invention.

FIG. 22 is an enlarged schematic diagram of the "key J" on the on-screen keyboard 68a shown in FIG. 21 and describes two marks on the "key J". The second key mark 74 in the top is highlighted, and in an aspect, a square, a black base, and white words are used. The first key mark 72 in the middle is highlighted in a color of semi-transparency and different shapes, and in an aspect, a circle and light grey is used. A figure of overlapped marks in the bottom is an enlarged schematic diagram of the "key J" in FIG. 21. To obviously distinguish the first key mark 72 and the second key mark 74, in some embodiments, the first key mark 72 and the second key mark 74 are marked in different shapes, such as combinations of a circle and a square, a square and a triangle, and a circle and a star. In some embodiments, the first key mark 72 and the second key mark 74 are marked in different colors, such as combinations of yellow and green, red and blue, black and yellow, and light grey and red. In some embodiments, the first key mark 72 and the second key mark 74 are marked in different shapes and different colors. In some embodiments, a mark marked at an upper layer is displayed in a manner of incomplete transparency, so that a mark at a lower layer can be seen. For example, if the first key mark 72 is located at the upper layer, and the second key mark 74 is located at the lower layer, the first key mark 72 is displayed in 50% of transparency. That is, the first key mark 72 or the second key mark 74 located at the upper layer has incomplete transparency. In some embodiments, if the same keycap 12*a* is touched and depressed, the keycap 12*a* may be marked with a third key mark of shapes and colors different from those of the first key mark 72 and the second key mark 74.

Figure 23:
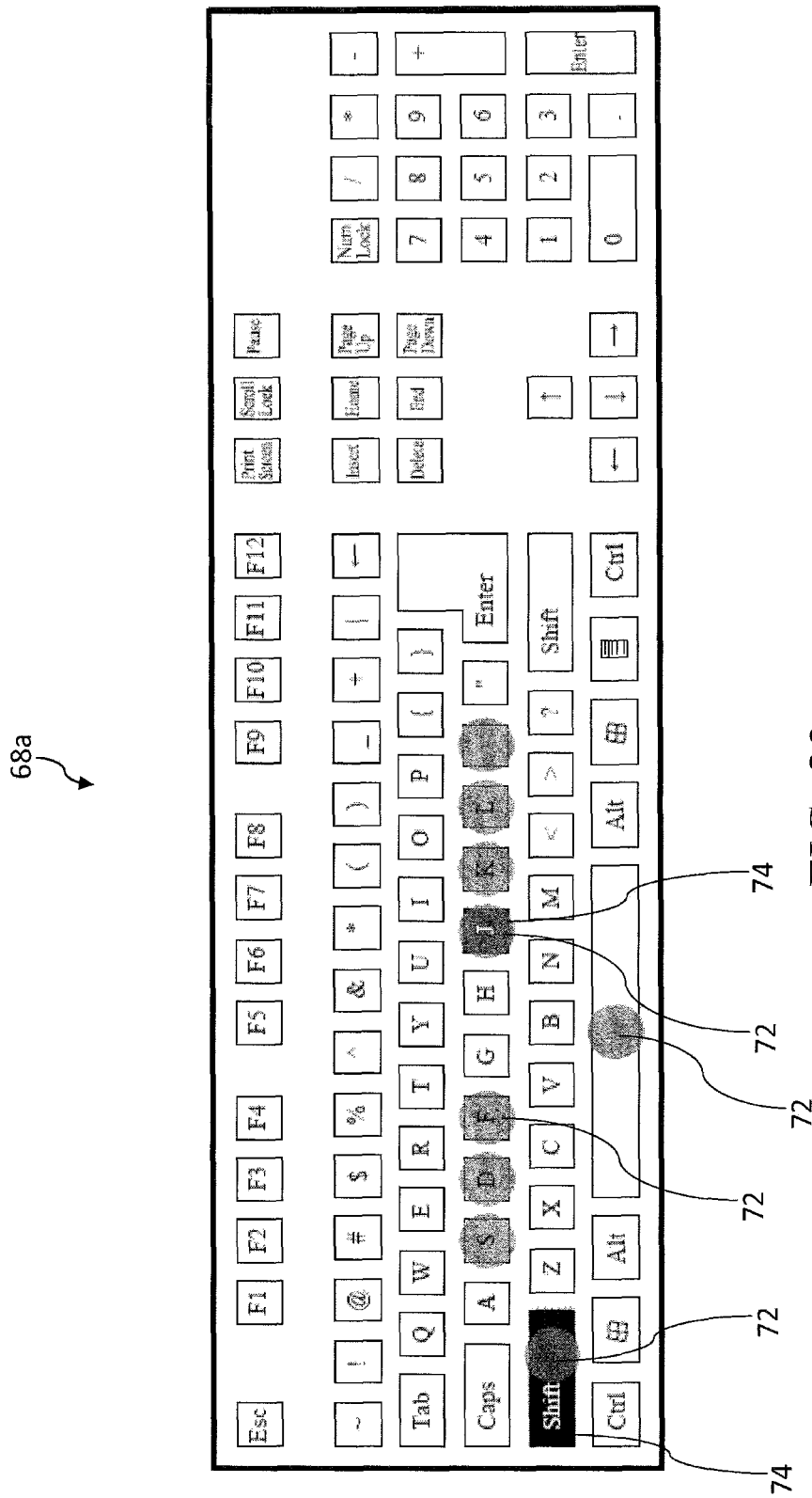
FIG. 23 is a schematic diagram (6) of the on-screen keyboard according to the first embodiment of the present invention.

FIG. 23 shows a mark displayed on the on-screen keyboard 68*a* when the fingers of the user are touching the keycaps 12*a* of the "Shift key", the "key S", the "key D", the "key F", the "key J", the "key K", the "key L", the "key ;" and the "space key" on the physical keyboard 18 (generating a first key signal) and are simultaneously depressing keycaps 12*a* of the "Shift key" and the "key J" (generating second key signals which are "Make Code"). This figure describes that after a keycap 12*a* of the "Shift key" is depressed and a second key signal is generated, the key representation characters on the on-screen keyboard 68*a* also change, that is, the key representation characters change from original lowercase to uppercase, and the key which has two key representation characters (such as numeric keys and symbolic keys) change from the original lower part to the upper part. For example, the "key 1" of the numeric keys has two key representation characters which respectively are the upper part "!" and the lower part "1", and the "key !" of the symbolic keys has two key representation characters which respectively are the upper part "?" and the lower part "/". When the "Shift key" is not depressed, "1" and "I" at the lower part are displayed (shown in FIG. 21), but after the "Shift key" is depressed, "!" and "?" at the upper part are displayed (shown in FIG. 23).

Figure 24:
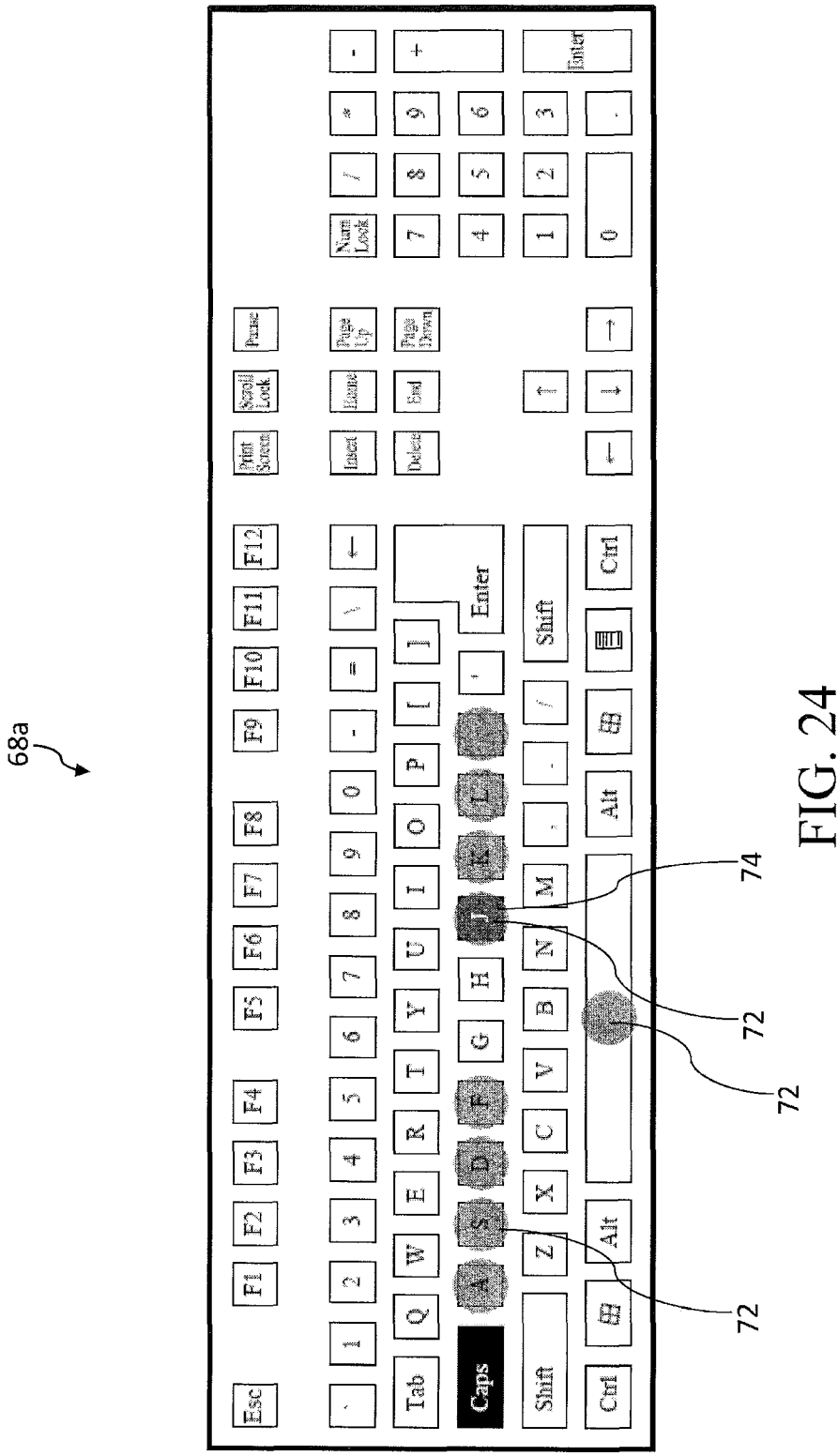
FIG. 24 is a schematic diagram (7) of the on-screen keyboard according to the first embodiment of the present invention.

FIG. 24 shows the marks displayed on the on-screen keyboard 68*a* when the finger of the user has depressed the keycap 12*a* of the caps-lock key (generating a second key signal which includes a "Make Code" and a "Break Code", that is, the keycap 12*a* is released), and then are touching the keycaps 12*a* of the "key A", the "key S", the "key D", the "key F", the "key J", the "key K", the "key L", the "key ;" and the "space key", and is depressing the keycap 12*a* of the "key J" (generating a second key signal which is a "Make Code"). The figure describes that after the keycap 12*a* of the caps-lock key generates a second key signal, the key representation characters of the letter keys on the on-screen keyboard 68*a* change from original lowercase letters to uppercase letters.

The two figures above describe that second key signals of the "Shift key" and the "caps-lock key" may enable the on-screen keyboard 68*a* to replace a part of key representation characters. Similarly, a "number-lock key" can also enable the on-screen keyboard 68*a* to replace a part of key representation characters. That is, the on-screen keyboard 68*a* not only has a function of displaying the first key mark 72 and the second key mark 74, but also includes a function of interacting with the second key signal.

Figure 25:
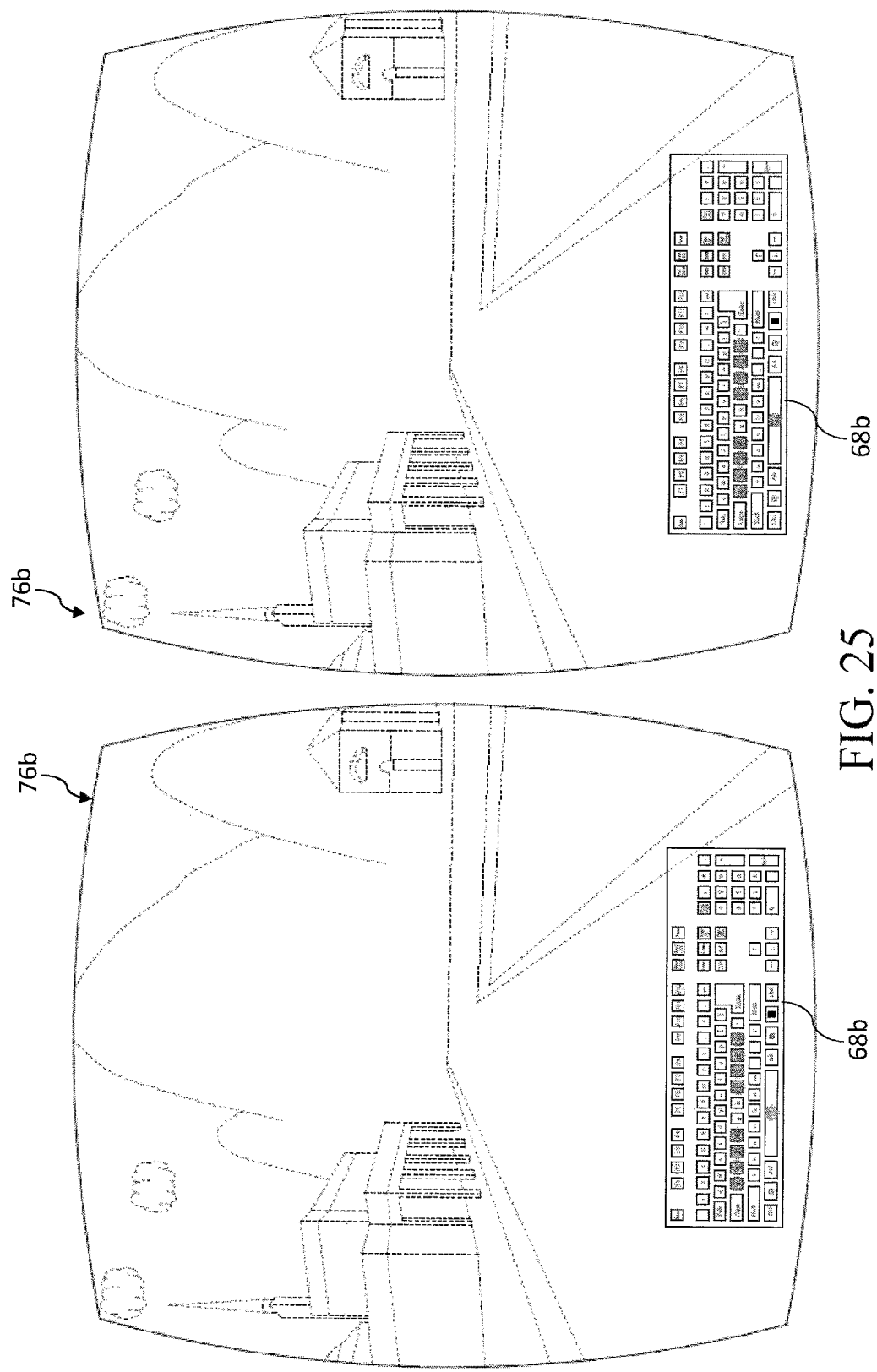
FIG. 25 is a schematic diagram (1) of an on-screen keyboard according to a second embodiment of the present invention.
Figure 26:
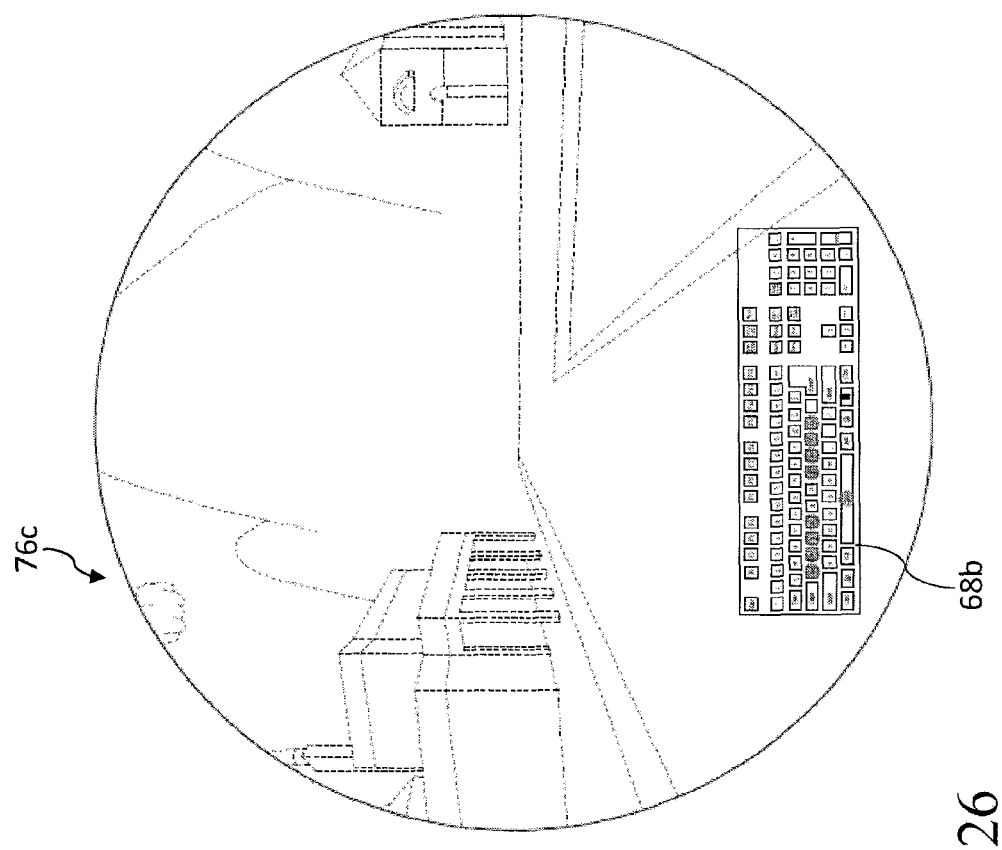
FIG. 26 is a schematic diagram (2) of the on-screen keyboard according to the second embodiment of the present invention.
Figure 26:
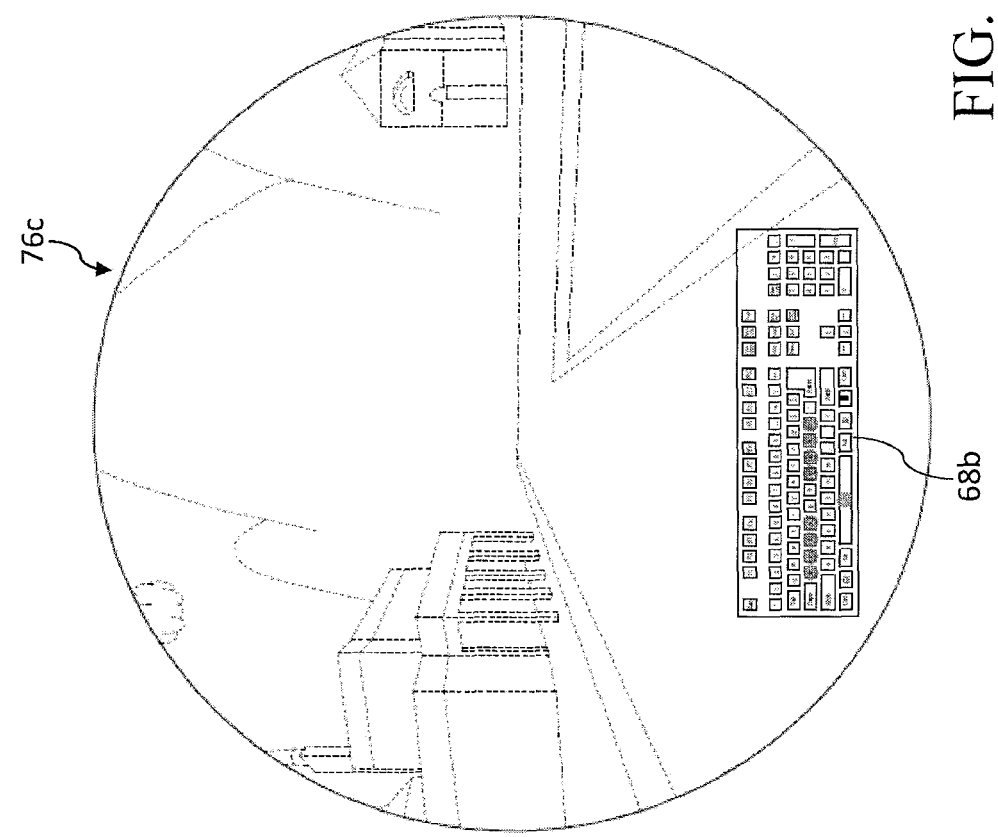
Figure 27:
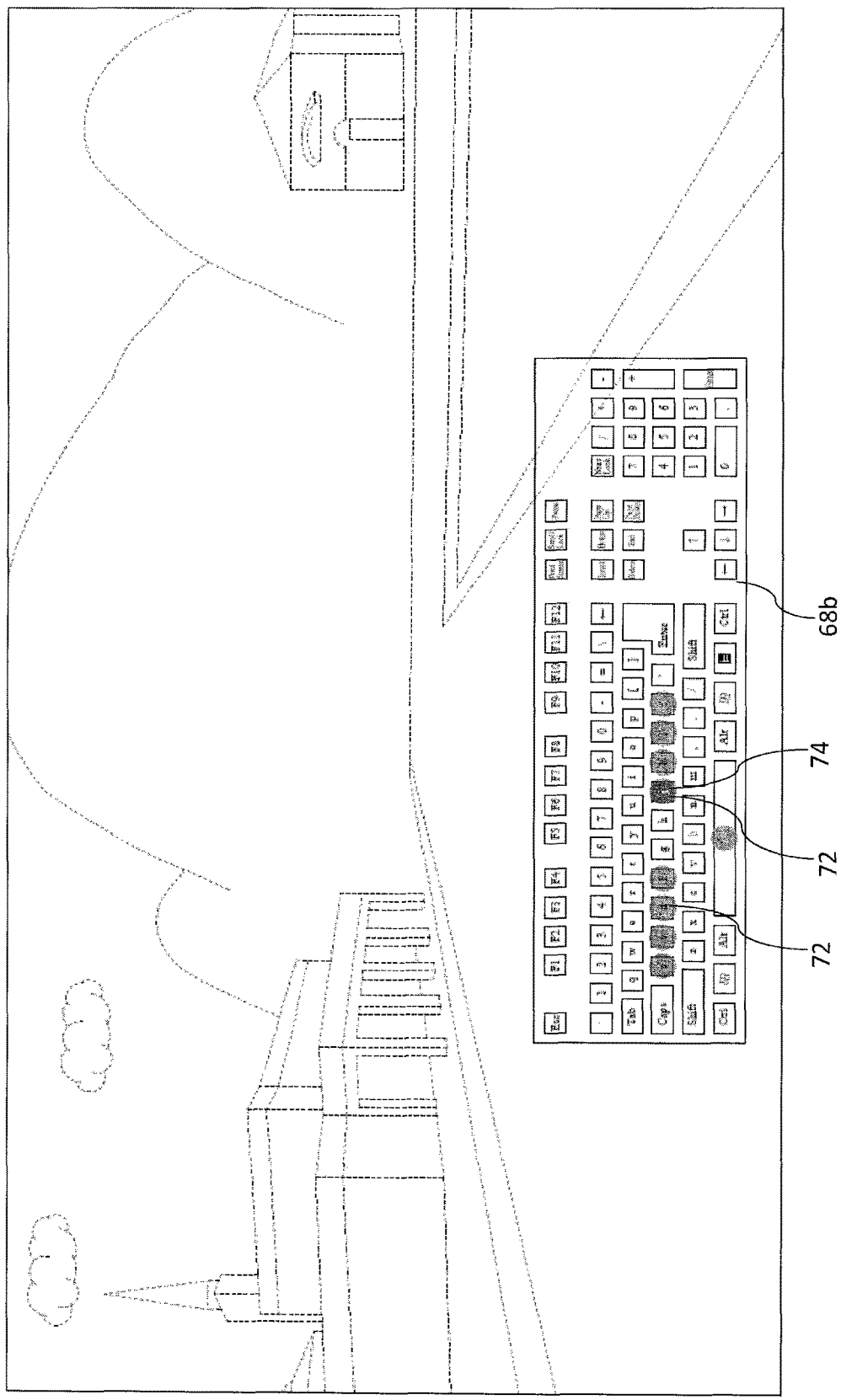
FIG. 27 is a schematic diagram (3) of the on-screen keyboard according to the second embodiment of the present invention.

Referring to FIG. 25 to FIG. 27, FIG. 25 to FIG. 27 are schematic diagrams of an on-screen keyboard 68*a* according to a second embodiment of the present invention. Display screens in this embodiment are screens 76*b* and 76*c* of a virtual reality display device, and the screens 76*b* and 76*c* are double-barrel-shaped (shown in FIG. 25) or double-circle-shaped (shown in FIG. 26). After a user puts the virtual reality display device on his head, his eyes see an image shown in FIG. 27. In some embodiments, the virtual reality display device is a computing device 64 having the screen 76*b* and 76*c* on itself. For example, a Gear VR of Samsung uses a smartphone as a computing device 64, and when the present invention is implemented, an on-screen keyboard 68*b* and a keyboard driver 46 are installed on the smartphone. In some embodiments, the virtual reality display device provides display images of the screens 76*b* and 76*c* and additionally needs to be in communication connection with a computing device 64 for installing software thereon and providing hardware computing resources. For example, HTC Vive uses a personal computer as the computing device 64, and when the present invention is implemented, an on-screen keyboard 68*b* and a keyboard driver 46 are installed on the personal computer. Herein, the on-screen keyboard 68*b* displays a keyboard layout in a manner of slight transparency, so that when the user uses the on-screen keyboard 68*b*, the user still sees a background image (a virtual reality image). If the user is not adept at touch-typing, when the user cannot stare at the physical keyboard 18 (for example, the user is mounted with a virtual reality display on his head), the user can clearly know the current finger standby position by using the on-screen keyboard 68*b* (by means of the first key mark 72), and which key is depressed (by means of the second key mark 74), facilitating typing of data by the user.

Figure 28:
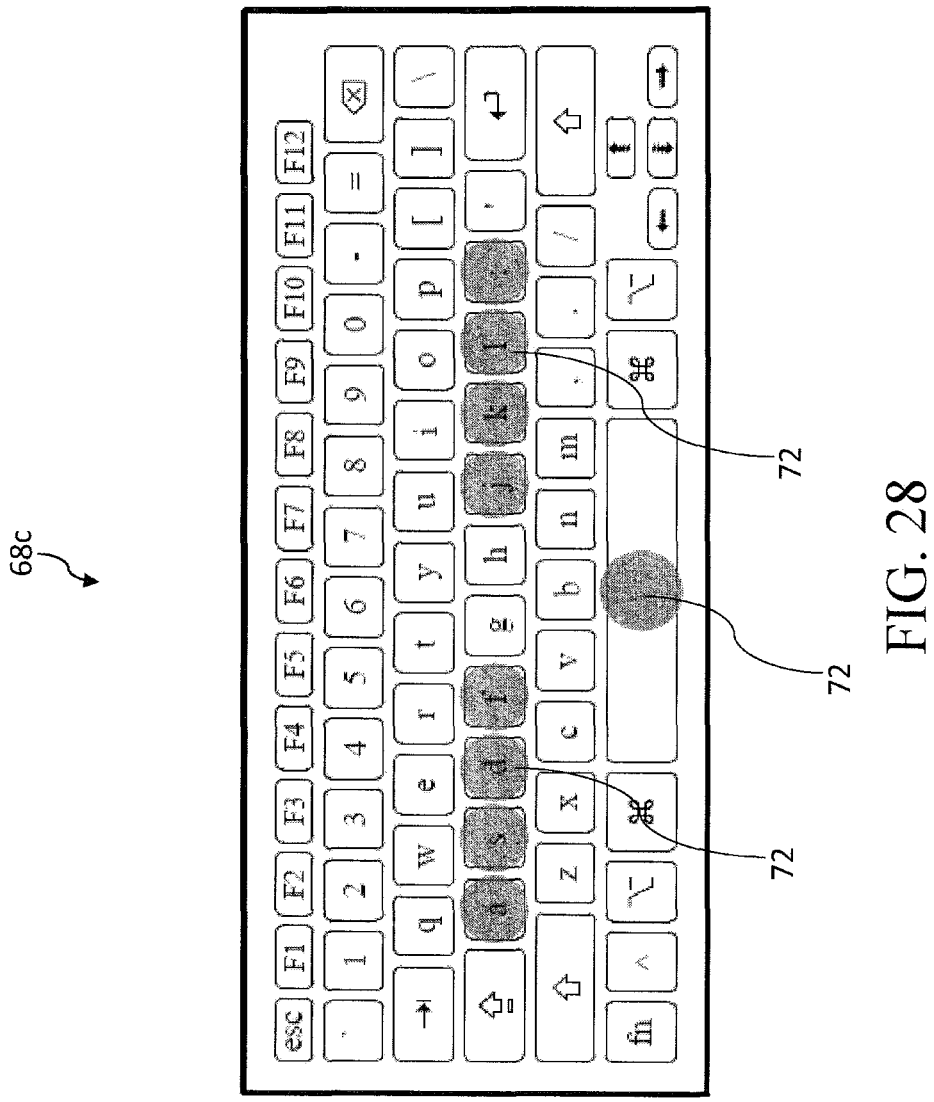
FIG. 28 is a schematic diagram of an on-screen keyboard according to a third embodiment of the present invention.

Referring to FIG. 28, FIG. 28 is a schematic diagram of an on-screen keyboard 68*c* according to a third embodiment of the present invention. Differences between the figure and the first embodiment and the second embodiment lie in that the figure is a keyboard layout corresponding to a physical keyboard of a Mac (not shown). Methods for displaying the first key mark 72 and the second key mark 74 and interacting with the second key signal by the on-screen keyboard 68*c* in this embodiment to replace a part of key representation characters are the same as those in the above-described embodiments, and details are not repeatedly described.

Figure 29:
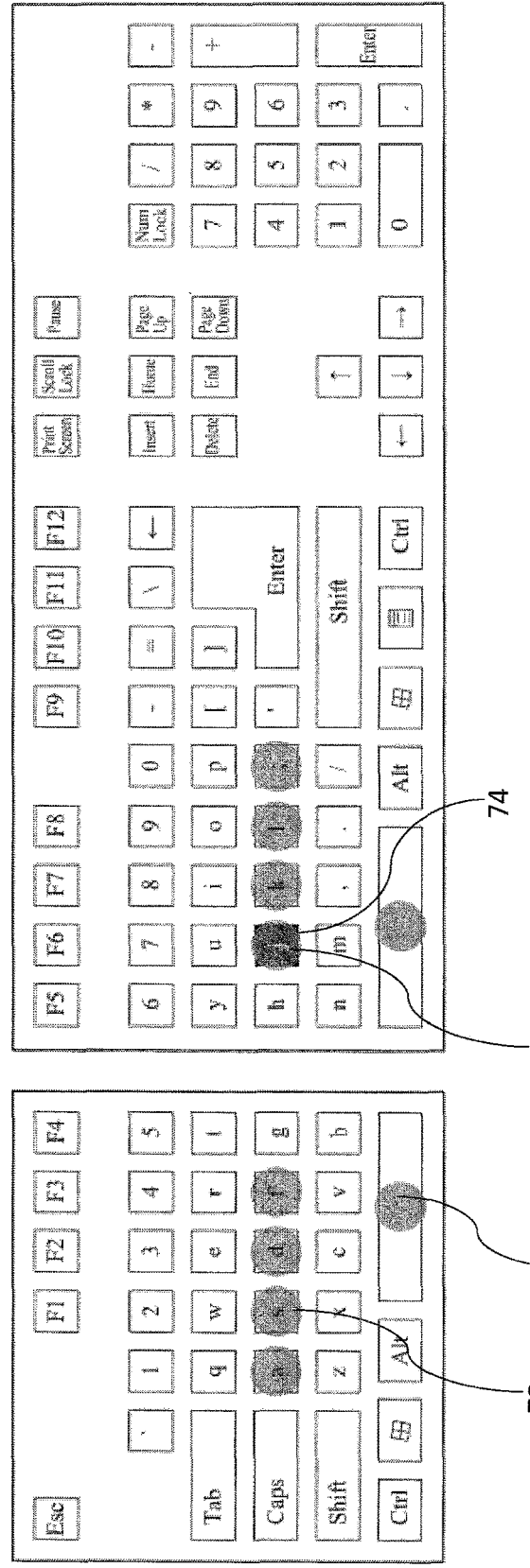
FIG. 29 is a schematic diagram of an on-screen keyboard according to a fourth embodiment of the present invention.

Referring to FIG. 29, FIG. 29 is a schematic diagram of an on-screen keyboard 68*d* according to a fourth embodiment of the present invention. A difference between this embodiment and the first embodiment lies in that a keyboard layout of the on-screen keyboard 68*d* is divided into two parts, a left part and a right part. That is, this embodiment corresponds to a physical keyboard (not shown) separated in a left and a right part. Marks of a first key mark 72 and a second key mark 74 of this embodiment are the same as those of the above-described embodiments, and details are not repeatedly described. Herein, a corresponding physical keyboard has 105 keys (that is, 104 standard keys of Windows and a repeated space key). In some embodiments, a keyboard layout of the physical keyboard is "80% scheme" (that is, rightmost numeric keys are omitted) and has 88 keys, and a keyboard layout of the on-screen keyboard separated with the left and right part (not shown) corresponding to the physical keyboard is also "80% scheme". In some other embodiments, a keyboard layout of the physical keyboard may be a keyboard separated by a left and a right part and is "75% scheme" or "80% scheme", or may be a keyboard separated by a left and a right part of a Mac. A corresponding on-screen keyboard uses the same keyboard layout as that of the physical keyboard.

Figure 30:
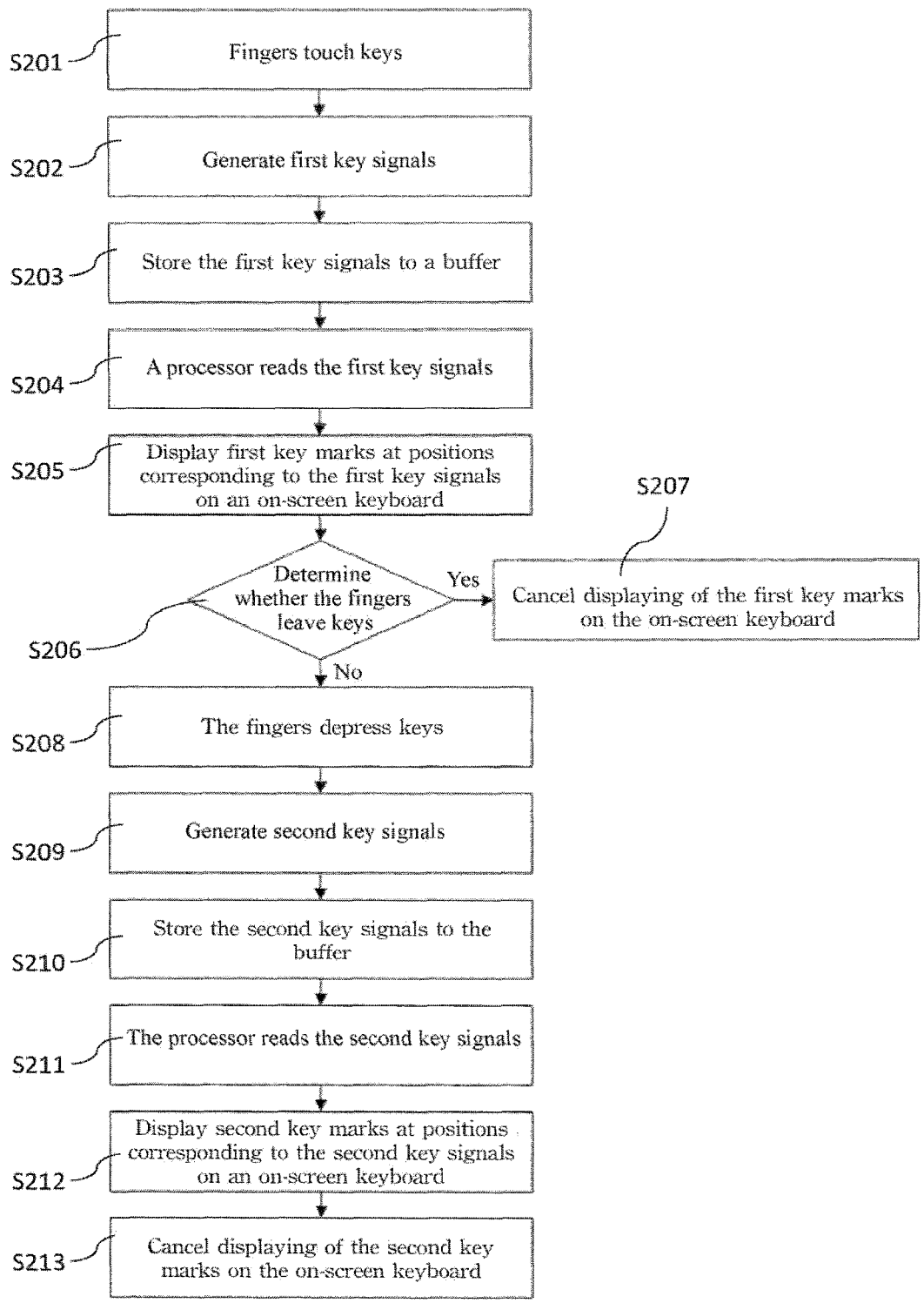
FIG. 30 is an operational flowchart of an on-screen keyboard according to an embodiment of the present invention.

Referring to FIG. 30, FIG. 30 is a flowchart of marking a first key mark 72 and a second key mark 74 on an on-screen keyboard 68a during an operating process of a user according to an embodiment of the present invention. FIG. 30 describes an operating procedure of generating a first key signal and a second key signal by a user by using a physical keyboard 18 of a computing device 64 and generating a corresponding first key mark 72 and a corresponding second key mark 74 on the on-screen keyboard 68a, and the procedure includes the following steps:

Step S201: Fingers touch keys. Fingers of a user touch keycaps 12a of the physical keyboard 18, but do not depress the keys. As shown in FIG. 20, the touched keycaps 12a are keycaps of a "key A", a "key S", a "key D", a "key F", a "key J", a "key K", a "key L", a "key ;" and a "space key". In this case, values of coupling capacitors of the touched keycaps 12a change, and a touch control determining unit 48 compares a default threshold 52 with the values of the coupling capacitors of the touched keycaps 12a to determine whether the keys are touched.

Step S202: Generate first key signals. In the previous step, after the touch control determining unit 48 determined the touched keycaps 12a, each touched keycap 12a generates a corresponding first key signal. Herein, a first key signal of the "key A", a first key signal of the "key S", a first key signal of the "key D", and so on, and a first key signal of the "space key" are generated.

Step S203: Store the first key signals to a buffer 461. In the previous step, after the touch control determining unit 48 generated the corresponding first key signals, a micro control unit 44 transmits the first key signals out so as to be received by the computing device 64. The computing device 64 stores the first key signals to a keyboard buffer 461 of the computing device 64 by using a keyboard driver 46 (that is, a part of the computer program product of the present invention). In some embodiments, the first key signal and the second key signal share the same buffer 461. In some embodiments, the buffer 461 is divided into a first buffer 462 and a second buffer 463. The first key signal is stored to its dedicated first buffer 462, and the second key signal is stored to its dedicated second buffer 463.

Step S204: A processor 66 reads the first key signals. In the previous step, after the micro control unit 44 stored the first key signals to the buffer 461 or the first buffer 462, there are two embodiments for the processor 66 to read the first key signals from the buffer 461 or the first buffer 462. In one embodiment, the micro control unit 44 sends an interrupt request to the processor 66 of the computing device 64, and then, the processor 66 of the computing device 64 responds to the interrupt request and reads the first key signals from the buffer 461 or the first buffer 462. In the other embodiment, the processor 66 of the computing device 64 automatically reads the first key signals in the buffer 461 or the first buffer 462 at set intervals in a polling manner. In some embodiments, after the processor 66 read the first key signal, the processor performs step S205 and transfers the first key signals to a touch control instruction generating module 47 to peform synchronization processing (that is, a job of continuous comparison).

Step S205: Display first key marks 72 at positions corresponding to the first key signals on an on-screen keyboard 68a. In the previous step, after the processor 66 reads the first key signals, the processor 66 displays, according to the first key signals, first key marks 72 at positions corresponding to the touched keycaps 12a on the on-screen keyboard 68a. Herein, the positions corresponding to the first key signals are the "key A", the "key S", the "key D", the "key F", the "key J", the "key K", the "key L", the "key ;" and the "space key", as shown in FIG. 19. The on-screen keyboard 68a is displayed on a topmost layer (that is, a view attribute is set as "Topmost") of a display image. In some embodiments, the on-screen keyboard 68a is displayed after the first key signal or the second key signal is read, and disappears when reaches an idle timeout. In some cases, even if the first key signal or the second key signal is not read, the on-screen keyboard 68a is still in a display state until reaches the idle timeout (if during which time the first key signal or the second key signal is not read). In some embodiments, the on-screen keyboard 68a may be displayed when an application is executed and be maintained in the display state, and disappear until a user ends the application. In some embodiments, the on-screen keyboard 68a is not promptly displayed when the application is executed, but is controlled by the user for displaying or disappearing.

Step S206: Determine whether the fingers leave keys. In an embodiment, the touch-control determining unit 48 can determine whether the fingers already leave the touched keycaps 12a according to the default threshold 52. In an embodiment, the processor 66 can determine whether the fingers already leave the touched keycaps 12a according to that whether the first key signals are continuously received. If the fingers leave the touched keycaps 12a, jump to step S207, and if the fingers still do not leave the touched keycaps 12a, jump to step S208.

Step S207: Cancel displaying of the first key marks 72 on the on-screen keyboard 68a. In an embodiment, when the touch control determining unit 48 determines that a finger left the touched keycap 12a, the on-screen keyboard 68a cancels displaying of a corresponding first key mark 72 (that is, corresponding to leaving of the finger from the touched keycap 12a). In an embodiment, if the computing device 64 does not receive again the first key signal corresponding to the touched keycap in a default time, displaying of the corresponding first key mark 72 is canceled. Using the above-described polling manner as an example, the processor 66 determines whether the same key signal is read every a preset time. If the same key signal is not read, it is determined that the finger left the touched keycap 12a, and displaying of the corresponding first key mark 72 is canceled.

Step S208: The fingers depress keys. When fingers depress keycaps 12a, key connection points 414 of the keycaps 12a of the depressed keys change from a normally open state to a conductive state due to keystrokes.

Step S209: Generate second key signals. When a keystroke determining unit 50 detects that a key connection point 414 of a keycap 12a changes from a mutually open state to a conductive state, a second key signal (which is a second key signal of depressing the keycap 12a) is generated. Herein, for example, the "key J" is depressed. The keystroke determining unit 50 generates a second key signal (that is, a "Make Code") of the "key J".

Step S210: Store the second key signals to the buffer 461. In the previous step, after the keystroke determining unit 50 generated the second key signals (the "Make Code"), the micro control unit 44 transmits the second key signals out so as to be received by the computing device 64. The computing device 64 stores the second key signals (the "Make Code") of the "key J" to the keyboard buffer 461 of the computing device 64 or a second buffer 463 dedicated to the second key signals by using the keyboard driver 46.

Step S211: The processor 66 reads the second key signals. In the previous step, after the micro control unit 44 stored the second key signals ("Make Code") to the buffer 461 or the second buffer 463, there are two embodiments for the processor 66 to read the second key signals from the buffer 461 or the second buffer 463. In one embodiment, the micro control unit 44 sends an interrupt request to the processor 66 of the computing device 64, and then, the processor 66 of the computing device 64 responds to the interrupt request and reads the second key signals from the buffer 461 or the second buffer 463. In the other embodiment, the processor 66 of the computing device 64 automatically reads the second key signals in the buffer 461 or the second buffer 463 at set intervals in a polling manner. That is, an action of reading the second key signals is triggered in an interruption or a polling manner.

Step S212: Display second key marks 74 at positions corresponding to the second key signals on the on-screen keyboard 68. In the previous step, after the processor 66 read the second key signals (the "Make Code"), the processor 66 displays, according to the second key signals, second key marks 74 at positions corresponding to the depressed keycaps 12a on the on-screen keyboard 68a. Herein, the positions corresponding to the second key signals are the "key J". The displayed second key marks 74 and the first key marks 72 displayed earlier are shown in FIG. 21.

Step S213: Cancel displaying of the second key marks 74 on the on-screen keyboard 68a. When the keystroke determining unit 50 detects that key connection points 414 of depressed keycaps 12a change from the conductive state to the normally open state, second key signals (which are second key signals of releasing the keycaps 12a) are generated. Herein, for example, the "key J" is released. The keystroke determining unit 50 generates a second key signal (that is, a "Break Code") of the "key J". After the keycap 12a is released, the computing device 64 stores the second key signal (the "Break Code") of the "key J" to the keyboard buffer 461 or the second buffer 463 dedicated to the second key signal by using the keyboard driver 46. Then, the processor 66 reads the second key signal (the "Break Code") of the "key J" Finally, according to the second key signal (the "Break Code") of the "key J", displaying of the corresponding second key mark 74 on the on-screen keyboard 68a is canceled, as shown in FIG. 19 (assuming that after a user released the "key J", a finger of the user is still touching the keycap 12a of the "key J"). In particular, the processor 66 may additionally determine whether the depressed key is a common key such as a letter key or a numeric key, or a locking key such as the above-described "Shift key". If a second key signal corresponding to a released keycap 12a is received and the keycap 12a does not belong to the locking-key type, displaying of a corresponding second key mark is canceled. Or otherwise, if a second key signal corresponding to a released keycap 12a is received and the keycap 12a belongs to the locking key, displaying of the corresponding second key mark is maintained, and displaying of the second key mark 74 is canceled until a second key mark 74 corresponding to a keystroke on the keycap 12a is received next time.

Methods for marking the first key mark 72 and the second key mark 74 on the on-screen keyboard 68a of an embodiment of the present invention are described above. Further, in some embodiments of the present invention, after step S207, assuming that fingers of a user have already completely left all keycaps 12a for an idle time, that is, during the idle time, the processor 66 of the computing device 64 does not detect (that is, read) the first key signal and the second key signal, the on-screen keyboard 68a is automatically hidden (not displayed on screen 76a). Or otherwise, if an original on-screen keyboard 68a is not displayed on the screen 76a, after the fingers of the user touch any keycaps 12a, the on-screen keyboard 68a is automatically displayed on the screen 76a. Objective of this embodiment lies in that when a user does not need to operate/type data by using a keyboard, the on-screen keyboard 68a is hidden so as to avoid occupation of the operating system desktop 70, so that the user can operate other applications by using other manipulation apparatuses. For example, the user operates a web page browser by using a mouse or a track ball to view web page data, or plays computer games by using a joystick.

In addition to representing a static finger standby position, the first key mark 72 on the on-screen keyboard 68a, 68b, 68c, and 68d is used to represent a dynamic touch control operation track in some embodiments. The referred "touch control operation track" actually is a dynamic touch track of a touch control event performed by fingers on a physical keyboard 18.

Figure 31:
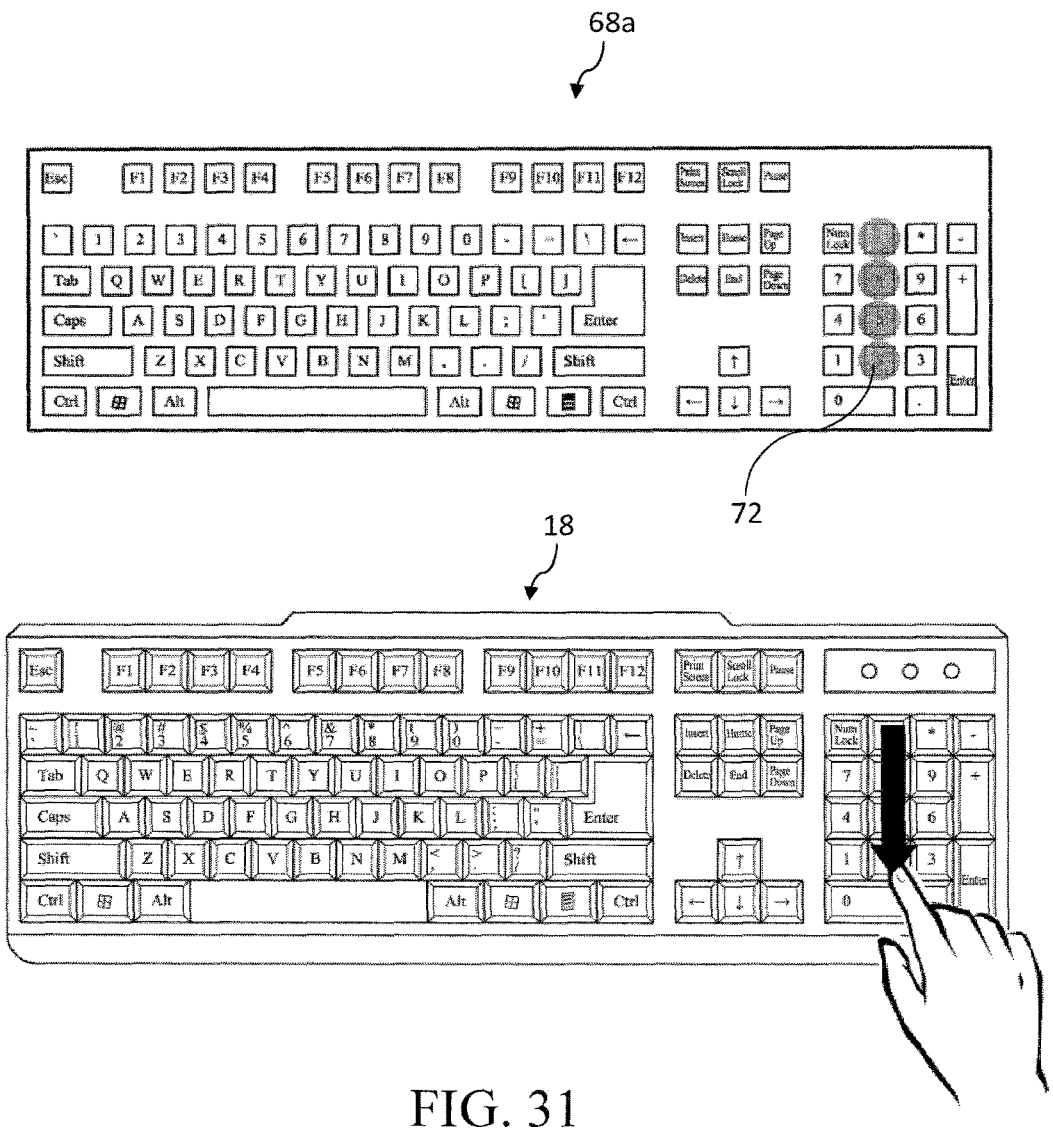
FIG. 31 is a schematic diagram of an on-screen keyboard and a touch control operation track according to an embodiment of the present invention.

Referring to FIG. 31, FIG. 31 is a schematic diagram of an on-screen keyboard 68a and a touch control operation track according to an embodiment of the present invention. The on-screen keyboard 68a in the top of the figure and the physical keyboard 18 in the bottom of the figure are not drawn according to an actual scale. The figure describes that when a user delivers, by using the physical keyboard 18 a touch control instruction, which is a window contraction instruction herein (referring to the instruction condition definition table in above-described embodiments for details), the user slides (only touches but not depresses) downwards with one finger in the first three rows of the numeric keys, and a touch control instruction generating module finally generates a window contraction instruction and transfers the window contraction instruction to a processor 66 for execution (a detailed intermediate procedure is described above and is not repeatedly described), so as to contract an active window. In this case, a corresponding first key mark 72 displayed on the on-screen keyboard 68a represents a touch control operation track of a touch control event of the window contraction instruction.

The computer program product of the present invention may include an on-screen keyboard 68a, a keyboard driver 46, a touch control instruction generating module 47, a touch control keyboard library (not shown), and/or a touch control keyboard application programming interface (APIs, not shown). A part of or all of the operation procedures described above in FIG. 17 and/or FIG. 30, may be encapsulated as the keyboard driver, the library or the application programming interface, so as to be further used by other applications. The computer program product may be stored in a computer readable recording medium, such as a Hard Disk Drive, a Solid State Disk, a CD, a DVD, a USB flash disk, a memory card, or recording media of other specifications, and can be loaded and executed by a computer (that is, the computing device 64 described above).

In various embodiments of the present invention, program instructions executed by a computing device can implement every block in the flowchart, a combination of the blocks in the flowchart, or the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a computing device of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In conclusion, because a touch control instruction of the present invention makes a reference to key positions of a physical keyboard as a basis for comparison of instruction conditions, and the image recognition technology is replaced with the touch sensing technology, problems of misjudgments caused by recognizing gestures by using images in the conventional technology can be reduced, thereby improving user experience. In addition, by means of replacing the image recognition technology with the touch sensing technology, a problem of capturing an image when ambient light sources are insufficient is also resolved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for generating a touch control instruction, applied to connecting to a computing device of a physical keyboard, wherein the physical keyboard comprises a plurality of keycaps capable of responding to a touch on the keycap to output a first key signal to the computing device, and the method for generating a touch control instruction comprises:

loading an instruction condition definition table, wherein the instruction condition definition table comprises a plurality of touch control instructions, and each touch control instruction comprises a plurality of instruction conditions and definition values corresponding to the instruction conditions;

reading the first key signal output by the physical keyboard to recognize which one of the keycaps is touched;

recognizing a touch control event according to an initial quantity, a moving direction, an area and a moving distance of multiple consecutive first key signals, wherein the initial quantity is the quantity of touched keycap at an initial time, the moving direction is determined by two neighboring keycaps touched sequentially, the area is an area of alphanumeric keys, an area of function keys, an area of modifier keys, an area of numeric keys, or an area of a qwerty keyboard, and the moving distance is the quantity of keycaps that are in the same direction and consecutively touched;

obtaining a plurality of detection values of the touch control event and comparing the detection values with the definition values;

if the detection values match definition values of all instruction conditions of a touch control instruction, stopping tracing of the touch control event; and executing the matched touch control instruction.

2. The method for generating a touch control instruction according to claim 1, wherein the physical keyboard further responds to a keystroke on the keycap to output a second key signal to the computing device, and the method for generating a touch control instruction further comprises:

reading the second key signal output by the physical keyboard corresponding to the keystroke on the keycap; and if the second key signal is read, suspending comparison of the touch control event.

3. The method for generating a touch control instruction according to claim 1, wherein one of the instruction conditions is the area, limited to accept particular touch control instruction, corresponding to the touch sensitive area of the physical keyboard, and a definition value of the area is the alphanumeric keys, the function keys, the numeric keys, the modifier keys, or the qwerty keyboard.

4. The method for generating a touch control instruction according to claim 1, wherein the computing device is further connected to a screen, the screen displays an on-screen keyboard, and the method for generating a touch control instruction further comprises:

displaying a first key mark at a position corresponding to the touched keycaps on the on-screen keyboard.

5. The method for generating a touch control instruction according to claim 1, wherein the touch control instruction at least comprises a horizontal scrolling instruction, a vertical scrolling instruction, a program switching instruction, a program closing instruction, a window contraction instruction, a window enlarging instruction, a content enlarging instruction, a content contraction instruction, or a rotate instruction;

wherein the horizontal scrolling instruction enables a horizontal scrolling bar of an active window to scroll towards a moving direction of the touch control instruction, the vertical scrolling instruction enables a vertical scrolling bar of the active window to scroll towards the moving direction of the touch control instruction, the program switching instruction enables a program in execution to be switched to be the active window, the program closing instruction enables the active window to be closed, the window contraction instruction enables the active window to be minimized, the window enlarging instruction enables the active window to be maximized, the content enlarging instruction enables content of the active window to be enlarged, the content contraction instruction enables the content of the active window to be minimized, and the rotate instruction enables the content of the active window to rotate clockwise or counterclockwise according to the moving direction of the touch control instruction.

6. A computer program product, comprising a plurality of computer executable instructions stored in a non-transitory computer readable medium, wherein the computer executable instructions are loaded and executed by a computing device connected to a physical keyboard to cause the computing device to implement a method for generating a touch control instruction, the physical keyboard comprises a plurality of keycaps capable of responding to a touch on the keycap to output a first key signal to the computing device, the method for displaying an on-screen keyboard comprises:

loading an instruction condition definition table, wherein the instruction condition definition table comprises a plurality of touch control instructions, and each touch control instruction comprises a plurality of instruction conditions and definition values corresponding to the instruction conditions;

reading the first key signal output by the physical keyboard to recognize which one of the keycaps is touched;

recognizing a touch control event according to an initial quantity, a moving direction, an area and a moving distance of multiple consecutive first key signals, wherein the initial quantity is the quantity of touched keycap at an initial time, the moving direction is determined by two neighboring keycaps touched sequentially, the area is an area of alphanumeric keys, an area of function keys, an area of modifier keys, an area of numeric keys, or an area of a qwerty keyboard, and the moving distance is the quantity of keycaps that are in the same direction and consecutively touched;

obtaining a plurality of detection values of the touch control event and comparing the detection values with the definition values;

if the detection values match definition values of all instruction conditions of a touch control instruction, stopping tracing of the touch control event; and executing the matched touch control instruction.

7. The computer program product for generating a touch control instruction according to claim 6, wherein the physical keyboard further responds to a keystroke on the keycap to output a second key signal to the computing device, and the method for generating a touch control instruction further comprises:

reading the second key signal output by the physical keyboard corresponding to the keystroke on the keycap; and if the second key signal is read, suspending comparison of the touch control event.

8. The computer program product for generating a touch control instruction according to claim 6, wherein one of the instruction conditions is the area, limited to accept particular touch control instruction, corresponding to the touch sensitive area of the physical keyboard, and a definition value of the area is the alphanumeric keys, the function keys, the numeric keys, the modifier keys, or the qwerty keyboard.

9. The computer program product for generating a touch control instruction according to claim 6, wherein the computing device is further connected to a screen, the screen displays an on-screen keyboard, and the method for generating a touch control instruction further comprises:

displaying a first key mark at a position corresponding to the touched keycaps on the on-screen keyboard.

10. The computer program product for generating a touch control instruction according to claim 6, wherein the touch control instruction at least comprises a horizontal scrolling instruction, a vertical scrolling instruction, a program switching instruction, a program closing instruction, a window contraction instruction, a window enlarging instruction, a content enlarging instruction, a content contraction instruction, or a rotate instruction;

wherein the horizontal scrolling instruction enables a horizontal scrolling bar of an active window to scroll towards a moving direction of the touch control instruction, the vertical scrolling instruction enables a vertical scrolling bar of the active window to scroll towards the moving direction of the touch control instruction, the program switching instruction enables a program in execution to be switched to be the active window, the program closing instruction enables the active window to be closed, the window contraction instruction enables the active window to be minimized, the window enlarging instruction enables the active window to be maximized, the content enlarging instruction enables content of the active window to be enlarged, the content contraction instruction enables the content of the active window to be minimized, and the rotate instruction enables the content of the active window to rotate clockwise or counterclockwise according to the moving direction of the touch control instruction.

11. The computer program product for generating a touch control instruction according to claim 6, wherein the computer executable instructions are encapsulated as a library, an application programming interface, or a keyboard driver.

12. A non-transitory computer readable medium, storing a computer program, wherein the computer program comprises a plurality of computer executable instructions that, when executed by a computing device connected to a physical keyboard, cause the computing device to implement a method for generating a touch control instruction, wherein the physical keyboard comprises a plurality of keycaps capable of responding to a touch on the keycap to output a first key signal to the computing device, the method for generating a touch control instruction comprises:

loading an instruction condition definition table, wherein the instruction condition definition table comprises a plurality of touch control instructions, and each touch control instruction comprises a plurality of instruction conditions and definition values corresponding to the instruction conditions;

reading the first key signal output by the physical keyboard to recognize which one of the keycaps is touched;

recognizing a touch control event according to an initial quantity, a moving direction, an area and a moving distance of multiple consecutive first key signals, wherein the initial quantity is the quantity of touched keycap at an initial time, the moving direction is determined by two neighboring keycaps touched sequentially, the area is an area of alphanumeric keys, an area of function keys, an area of modifier keys, an area of numeric keys, or an area of a qwerty keyboard, and the moving distance is the quantity of keycaps that are in the same direction and consecutively touched;

obtaining a plurality of detection values of the touch control event and comparing the detection values with the definition values;

if the detection values match definition values of all instruction conditions of a touch control instruction, stopping tracing of the touch control event; and executing the matched touch control instruction.

13. The non-transitory computer readable medium according to claim 12, wherein the physical keyboard further responds to a keystroke on the keycap to output a second key signal to the computing device, and the method for generating a touch control instruction further comprises:

reading the second key signal output by the physical keyboard corresponding to the keystroke on the keycap; and if the second key signal is read, suspending comparison of the touch control event.

14. The non-transitory computer readable medium according to claim 12, wherein one of the instruction conditions is the area, limited to accept particular touch control instruction, corresponding to the touch sensitive area of the physical keyboard, and a definition value of the area is the alphanumeric keys, the function keys, the numeric keys, the modifier keys, or the qwerty keyboard.

15. The non-transitory computer readable medium according to claim 12, wherein the computing device is further connected to a screen, the screen displays an on-screen keyboard, and the method for generating a touch control instruction further comprises:

displaying a first key mark at a position corresponding to the touched keycaps on the on-screen keyboard.

16. The non-transitory computer readable medium according to claim 12, wherein the touch control instruction at least comprises a horizontal scrolling instruction, a vertical scrolling instruction, a program switching instruction, a program closing instruction, a window contraction instruction, a window enlarging instruction, a content enlarging instruction, a content contraction instruction, or a rotate instruction;

wherein the horizontal scrolling instruction enables a horizontal scrolling bar of an active window to scroll towards a moving direction of the touch control instruction, the vertical scrolling instruction enables a vertical scrolling bar of the active window to scroll towards the moving direction of the touch control instruction, the program switching instruction enables a program in execution to be switched to be the active window, the program closing instruction enables the active window to be closed, the window contraction instruction enables the active window to be minimized, the window enlarging instruction enables the active window to be maximized, the content enlarging instruction enables content of the active window to be enlarged, the content contraction instruction enables the content of the active window to be minimized, and the rotate instruction enables the content of the active window to rotate clockwise or counterclockwise according to the moving direction of the touch control instruction.

17. The non-transitory computer readable medium according to claim 12, wherein the computer executable instructions are encapsulated as a library, an application programming interface, or a keyboard driver.

* * * * *